(12) United States Patent
Stanczak et al.

(10) Patent No.: US 9,278,647 B2
(45) Date of Patent: Mar. 8, 2016

(54) VEHICLE BODY STRUCTURE

(71) Applicant: Nissan North America, Inc., Franklin, TN (US)

(72) Inventors: Matthew Stanczak, Troy, MI (US); Hidetake Matsuoka, Kanagawa (JP)

(73) Assignee: Nissan North America, Inc., Franklin, TN (US)

( * ) Notice: Subject to any disclaimer, the term of this patent is extended or adjusted under 35 U.S.C. 154(b) by 21 days.

(21) Appl. No.: 14/291,240

(22) Filed: May 30, 2014

(65) Prior Publication Data

US 2015/0343953 A1 Dec. 3, 2015

(51) Int. Cl.
*B60R 5/04* (2006.01)
*B60N 2/20* (2006.01)
*B60N 2/36* (2006.01)

(52) U.S. Cl.
CPC ............... *B60R 5/045* (2013.01); *B60N 2/206* (2013.01); *B60N 2/36* (2013.01)

(58) Field of Classification Search
CPC ........... B60R 5/045; B60N 2/206; B60N 2/36
USPC ................. 296/37.16, 37.14, 24.44
See application file for complete search history.

(56) References Cited

U.S. PATENT DOCUMENTS

| | | | | |
|---|---|---|---|---|
| 6,113,172 | A * | 9/2000 | Chaloult | B60N 2/3011 224/496 |
| 7,600,800 | B2 * | 10/2009 | Suzuki | B60R 5/04 296/37.14 |
| 8,172,295 | B2 | 5/2012 | Fischer et al. | |
| 8,534,736 | B1 | 9/2013 | Whalen | |
| 2010/0187857 | A1 * | 7/2010 | Fischer | B60R 5/045 295/184.1 |
| 2013/0009419 | A1 * | 1/2013 | Torres | B60R 5/044 296/24.45 |
| 2013/0147226 | A1 * | 6/2013 | Cao | B60R 5/045 296/37.16 |
| 2013/0193708 | A1 * | 8/2013 | Lucas | B60R 7/043 296/37.16 |
| 2014/0117695 | A1 * | 5/2014 | Murru | B60R 5/04 296/24.44 |

FOREIGN PATENT DOCUMENTS

| | | | |
|---|---|---|---|
| EP | 1619077 A1 | 1/2006 | |
| EP | 2033842 A2 | 3/2009 | |
| EP | 2095998 A1 | 9/2009 | |
| EP | 2105352 A1 | 9/2009 | |
| JP | 2001-328488 A | 11/2001 | |
| JP | 2001328488 | * 11/2001 | ................ B60R 5/04 |
| JP | 2003-291732 A | 10/2003 | |
| JP | 2003291732 A | * 10/2003 | ................ B60R 5/04 |
| JP | 2006-062618 A | 3/2006 | |
| JP | 2009-161034 A | 7/2009 | |
| JP | 2013-111992 A | 6/2013 | |

* cited by examiner

*Primary Examiner* — Jason S Morrow
*Assistant Examiner* — E Turner Hicks
(74) *Attorney, Agent, or Firm* — Global IP Counselors, LLP

(57) ABSTRACT

A vehicle body structure includes a rear seat, a forward shelf and an aft shelf. The forward shelf is movable between first and second retention locations and the aft shelf is movable between horizontal and vertical retention locations defined by side wall structures. The second retention location is above the first retention location. In the second retention location the forward shelf is located proximate an upper end of the upright seatback. With the aft shelf in the horizontal retention location and the forward shelf in the first retention location, the forward shelf and the aft shelf are co-planar. With the seatback upright, the aft shelf in the vertical retention location and the forward shelf in the second retention location, the back surface of the seatback, the forward shelf and the aft shelf define an enclosed storage space.

20 Claims, 20 Drawing Sheets

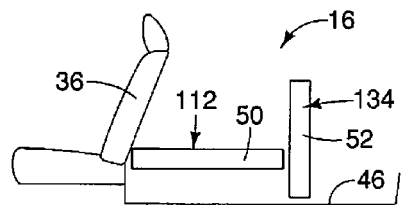
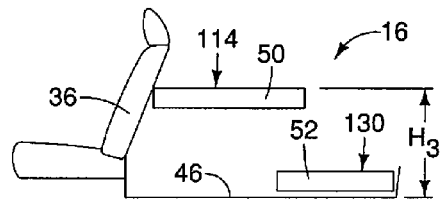
FIG. 40      FIG. 41
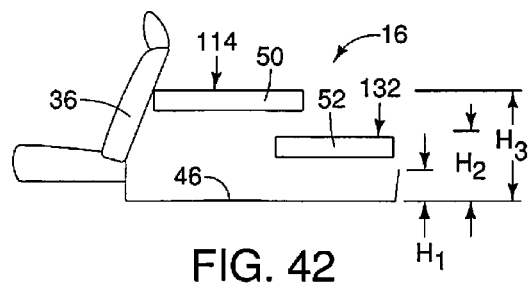
FIG. 42
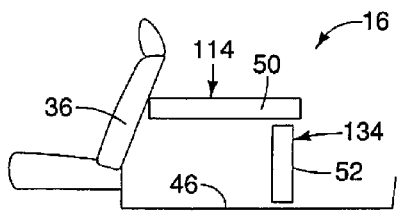
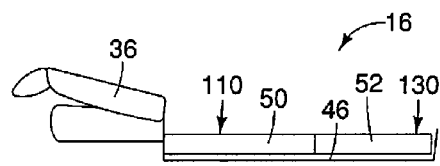
FIG. 43      FIG. 44
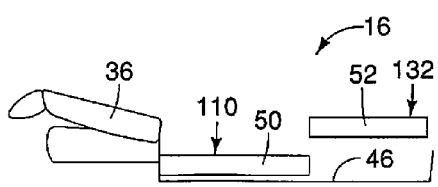
FIG. 45

VEHICLE BODY STRUCTURE

BACKGROUND

1. Field of the Invention

The present invention generally relates to a vehicle body structure that defines a vehicle cargo area. More specifically, the present invention relates to vehicle body structure that includes a plurality of shelf supporting surfaces with a forward shelf positioned at any one of a plurality of locations within the vehicle cargo area and an aft shelf positionable at any one of a plurality of locations within the vehicle cargo area.

2. Background Information

A new passenger vehicle typically includes a cargo area that can receive a variety of cargo. Most cargo areas typically include a deck surface and an optional cover in order to conceal any cargo related objects placed on the deck surface.

SUMMARY

One object of the invention is to provide a vehicle cargo area with shelf members that are positionable at a plurality of locations within the cargo area.

In view of the state of the known technology, one aspect of the disclosure is a vehicle body structure that includes a vehicle floor, a first side wall structure, a second side wall structure, a rear seat, a forward shelf and an aft shelf. The first side wall structure extends upward from a first side of the vehicle floor. The second side wall structure extends upward from a second side of the vehicle floor opposite the first side wall structure. The vehicle floor, the first side wall structure and the second side wall structure at least partially define a vehicle cargo area. The rear seat is fixedly attached to the vehicle floor and has a seatback movable between an upright orientation and a folded orientation. A back surface of the seatback at least partially defines the vehicle cargo area with the seatback in the upright orientation. The forward shelf extends from the first side wall structure to the second side wall structure within the vehicle cargo area. The forward shelf is movable between a first retention location and a second retention location defined by forward shelf supporting surfaces of the first and second side wall structures. The first retention location is defined a first distance above the vehicle floor and the second retention location is defined at a second distance above the vehicle floor. The second distance is greater than the first distance. With the forward shelf in the second retention location, the forward shelf is located proximate an upper end of the seatback with the seatback in the upright orientation. The aft shelf extends from the first side wall structure to the second side wall structure within the vehicle cargo area adjacent to the forward shelf. The aft shelf is movable between a horizontal retention location and a vertical retention location defined by aft shelf supporting surfaces of the first and second side wall structures. With the aft shelf in the horizontal retention location and the forward shelf in the first retention location, an upper surface of the forward shelf and an upper surface of the aft shelf are co-planar. With the seatback in the upright orientation, the aft shelf in the vertical retention location and the forward shelf in the second retention location, the back surface of the seatback, the forward shelf and the aft shelf define a completely enclosed storage space between the first and second side surface structures.

BRIEF DESCRIPTION OF THE DRAWINGS

Referring now to the attached drawings which form a part of this original disclosure:

FIGS. 34-43 are schematic side views of the cargo area with the seatback of the rear seat in the upright orientation, with the forward and aft shelves in various combinations of positions in accordance with the first embodiment;

FIG. 44-53 are schematic side views of the cargo area with the seatback of the rear seat in the folded orientation, with the forward and aft shelves in various combinations of positions in accordance with the first embodiment;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
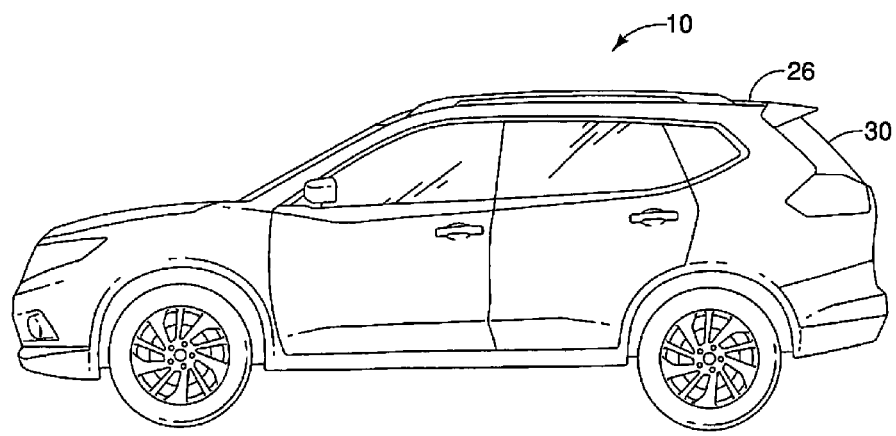
FIG. 1 is a side view of a vehicle that includes a body structure that defines a cargo area with a shelving arrangement in accordance with a first embodiment.
Figure 2:
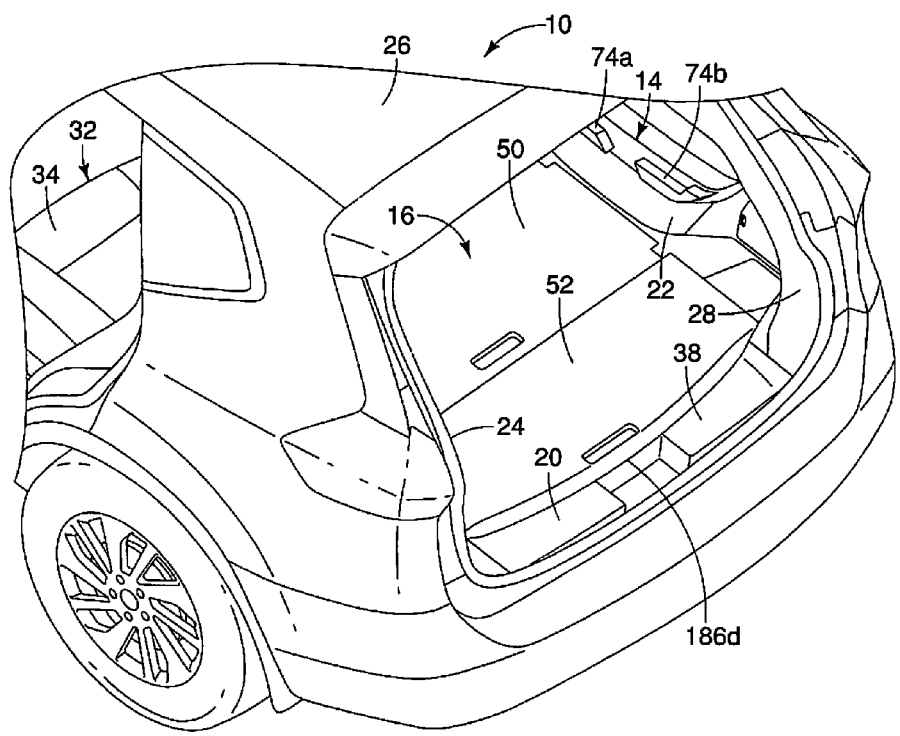
FIG. 2 is a rear perspective view of the vehicle with a rear door removed showing a portion of the cargo area along with a forward shelf and an aft shelf in accordance with the first embodiment.
Figure 3:
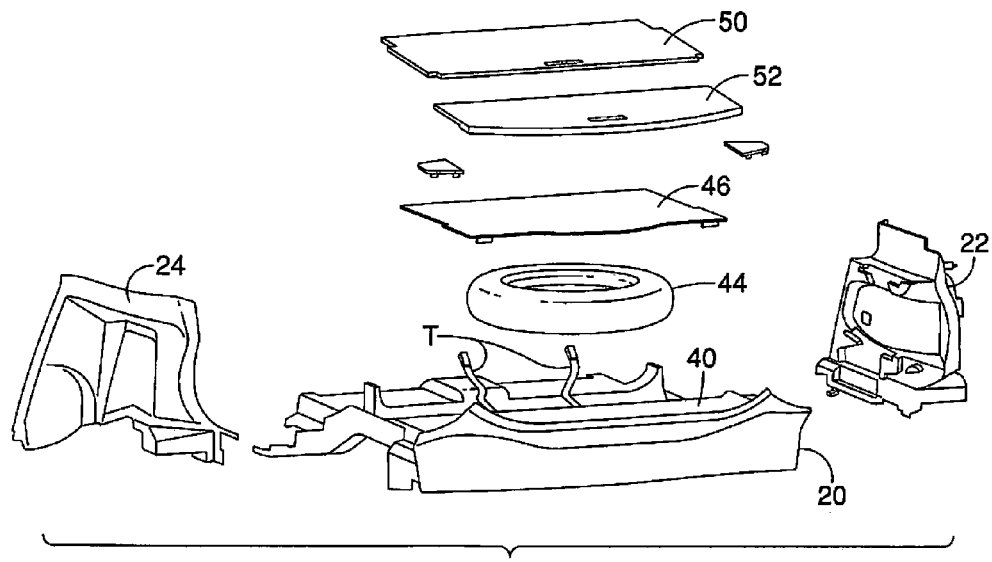
FIG. 3 is an exploded view of portions of the body structure that define the cargo area, including a floor structure, a first side wall structure, a second side wall structure, a deck panel, the forward shelf and the aft shelf in accordance with the first embodiment.

Referring initially to FIG. 1, a vehicle 10 is illustrated in accordance with a first embodiment. As shown in FIG. 2, the vehicle 10 includes a vehicle body structure 12 that defines a cargo area 14 with a shelving arrangement 16 that is described in greater detail below. The vehicle body structure 12 has, among other elements, a floor structure 20, a first side wall structure 22, a second side wall structure 24 and a roof structure 26.

The floor structure 20, the first side wall structure 22, the second side wall structure 24 and the roof structure 26 define a rear hatch opening 28 that is covered by a rear door 30 that moves between an open position (not shown) and a closed position (FIG. 1) covering the rear hatch opening 28. In FIG. 2, the rear door 30 has been removed to reveal the cargo area 14.

Figure 4:
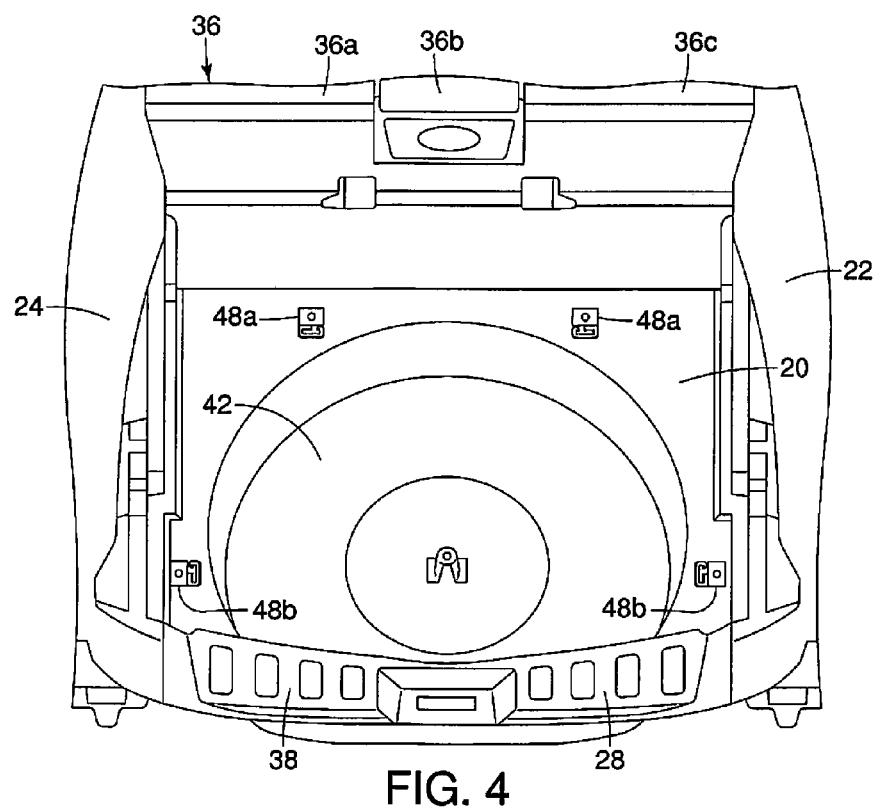
FIG. 4 a rear perspective view showing the cargo area with the deck panel, the forward shelf and the aft shelf removed to reveal details of the floor structure in accordance with the first embodiment.
Figure 5:
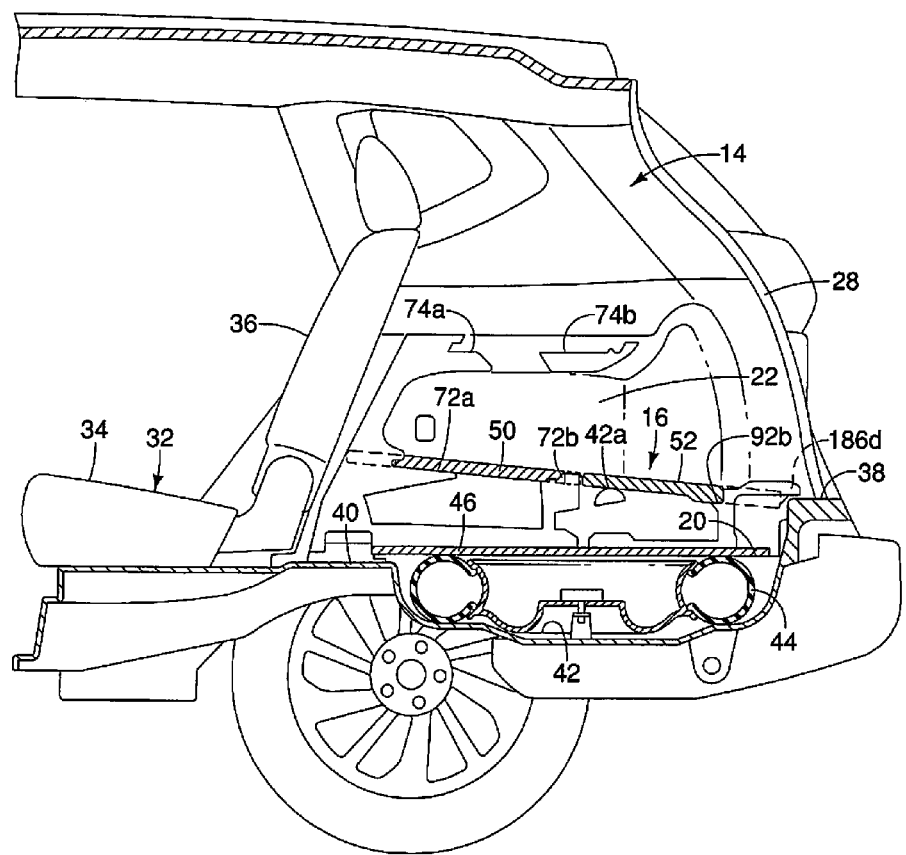
FIG. 5 a cross-sectional side view of the vehicle showing the floor structure, the deck panel, the forward shelf and the aft shelf and details of the first side wall structure including shelf supporting surfaces and shelf guiding surfaces in accordance with the first embodiment.

A rear seat assembly 32 is attached to the floor structure 20 in a conventional manner, as shown in FIGS. 2, 4 and 5. For example, the rear seat assembly 32 can be attached to the floor structure 20 with removable fasteners (not shown). The rear seat assembly 32 includes a seat cushion 34 (FIGS. 2 and 5) and seatback 36 (FIGS. 4 and 5), which include seatback sections 36a, 36b and 36c (FIG. 4). The seatback 36 (and individual seatback sections 36a, 36b and 36c) are movable between an upright orientation shown in FIGS. 5 and 34, and a folded orientation shown in FIG. 44.

Figure 19:
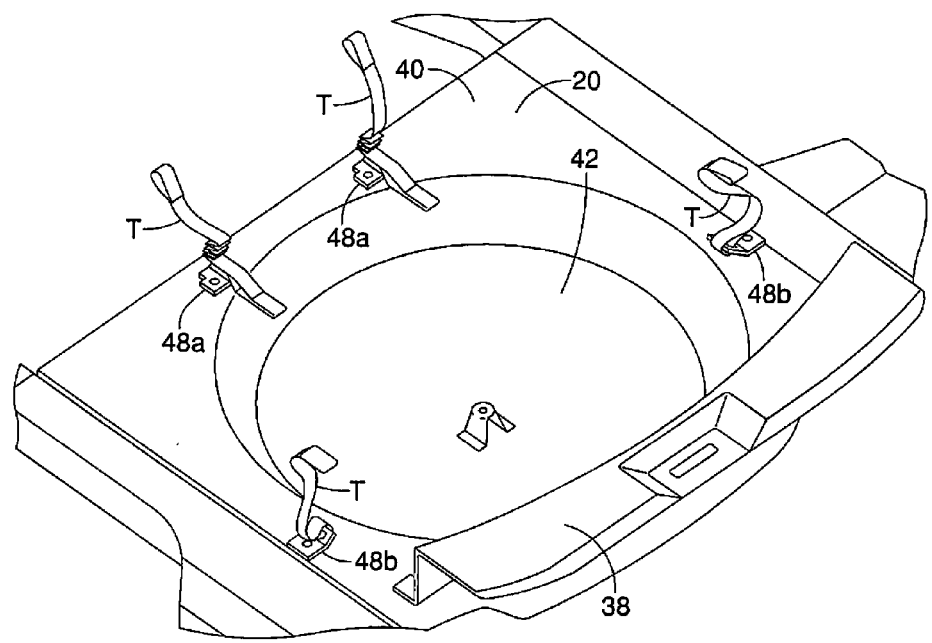
FIG. 19 is a perspective view of the floor structure showing the tether clips and tethers in accordance with the first embodiment.

As shown in FIGS. 4 and 19, the floor structure 20 also includes sill section 38 that partially defines the rear hatch opening 28.

The cargo area 14 is located rearward of the seatback 36 of the rear seat assembly 32 with the seatback 36 in the upright orientation. When the seatback 36 is moved to the folded orientation, the cargo area 14 is extended such that cargo can be placed on the upwardly facing surface of the seatback 36 (in the folded orientation). The cargo area 14 is further defined within the vehicle 10 between the first and second side wall structures 22 and 24, above the floor structure 20.

As shown in FIGS. 3-5 and 18-19, the floor structure 20 has an upper surface 40 that includes a concaved area defining a concealed cargo space 42 sufficient to receive a spare tire 44. The concealed cargo space 42, as shown in the drawings, is a circular shaped concaved area that is shaped to receive the spare tire 44, but can alternatively have a differing shape in order to store additional vehicle related elements. As shown in FIG. 5, the concealed cargo space 42 is concealed below the shelving arrangement 16. Specifically, a deck panel 46 is dimensioned and shaped to overlay and cover most of the upper surface 40 of the floor structure 20. Further, the deck panel 46 extends along the bottom of the cargo area 14.

Figure 6:
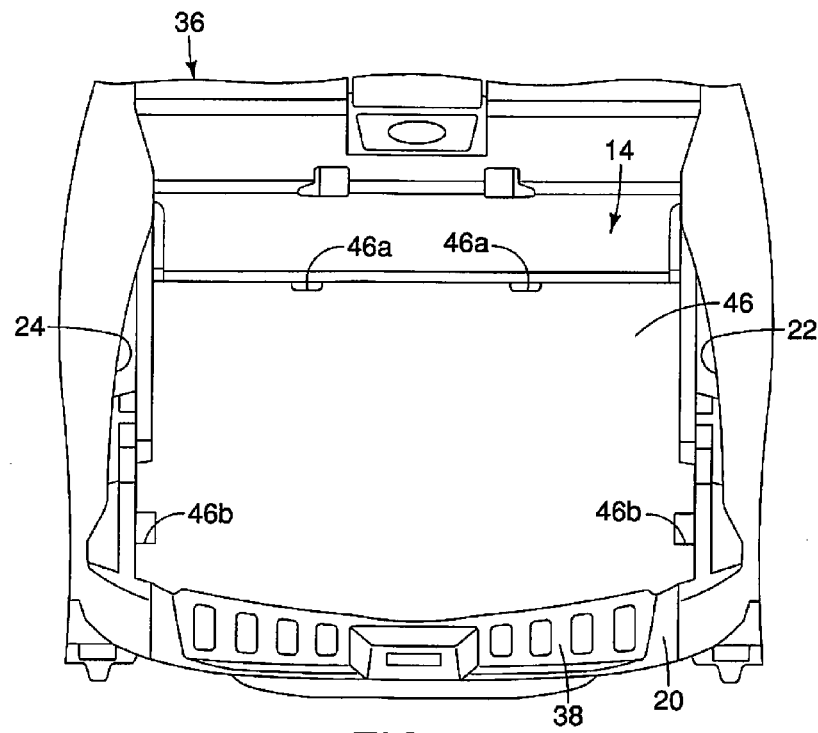
FIG. 6 another rear perspective view similar to FIG. 4 showing the cargo area with the deck panel installed covering portions of the floor structure in accordance with the first embodiment.
Figure 20:
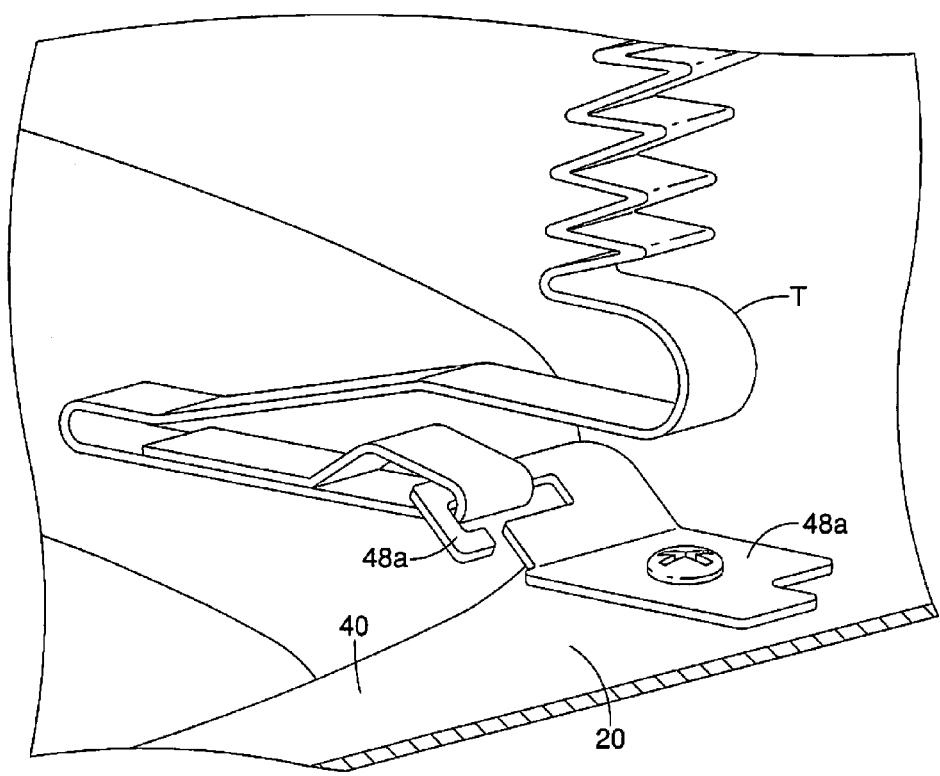
FIG. 20 is a close-up perspective view of a portion of the floor structure showing one of the tether clips and one of the tethers in accordance with the first embodiment.

As shown in FIG. 4, the floor structure 20 also includes four tether clips 48 that are rigidly fixed in position by, for example, mechanical fasteners. The tether clips 48 and tethers T are described in greater detail below with reference to FIGS. 18-20. The tether clips 48 are hidden beneath the deck panel 46. However, the deck panel 46 includes tether recesses 46a and 46b, as shown in FIG. 6. The tethers T extend through the tether recesses 46a and 46b.

A description of the shelving arrangement 16 is now provided with specific reference to FIGS. 8-33. The shelving arrangement 16 is basically defined by the first side wall structure 22, the second side wall structure 24, a forward shelf 50 and an aft shelf 52. As is described in greater detail below, the first and second side wall structures 22 are configured to support the forward shelf 50 and the aft shelf 52 in a variety of positions. In the positions shown in FIG. 7, the forward shelf 50 and the aft shelf 52 completely cover the floor structure 20 and the deck panel 46. With the forward shelf 50 and the aft shelf 52 in other positions (described below), portions of the deck panel 46 can be exposed, as described below.

Figure 8:
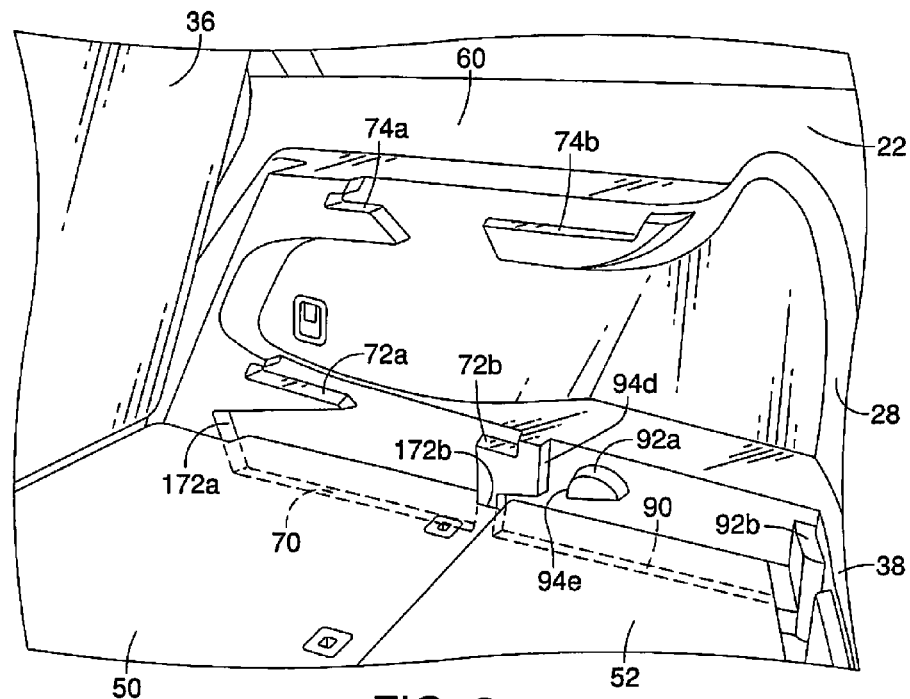
FIG. 8 is a perspective view of the cargo area showing the floor structure and the first side wall structure including most of the shelf supporting surfaces and the shelf guiding surfaces in accordance with the first embodiment.
Figure 10:
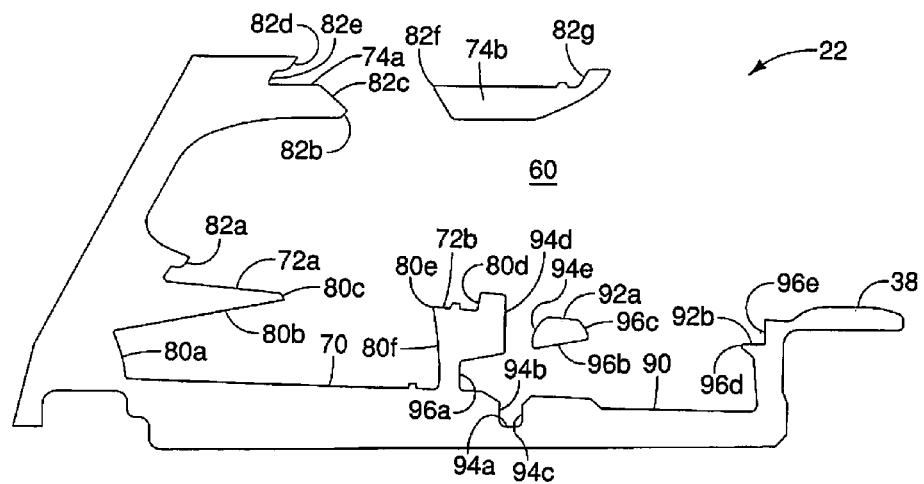
FIG. 10 is a schematic side view of the first side wall structure showing only the shelf supporting surfaces and the shelf guiding surfaces in accordance with the first embodiment.

The first side wall structure 22 can include a plurality of elements, such as an outer side panel and an inner side panel. However, for purposes of understanding the shelving arrangement 16, description of the first side wall structure 22 is directed to an interior surface 60, as shown in FIGS. 8 and 10. The interior surface 60 of the first side wall structure 22 extends upward from a first side the floor structure 20 within the cargo area 14. The interior surface 60 includes a plurality of protrusions and adjacent recesses that together define a plurality of surfaces that are further described below.

Figure 9:
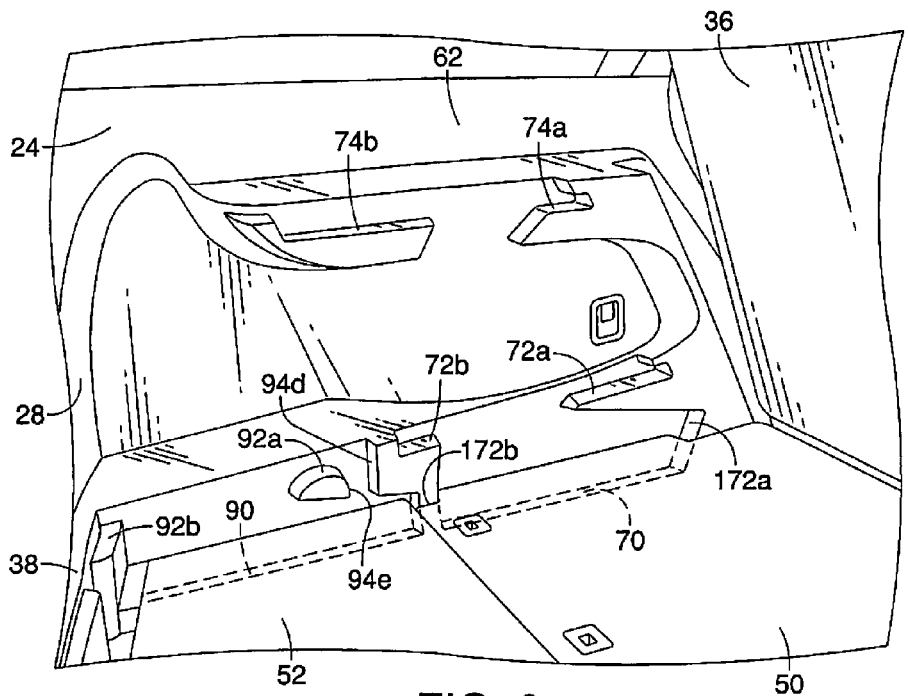
FIG. 9 is another perspective view of the cargo area showing the floor structure and the second side wall structure including most of the shelf supporting surfaces and the shelf guiding surfaces in accordance with the first embodiment.

The second side wall structure 24 can similarly include a plurality of elements, such as an outer side panel and an inner side panel. However, for purposes of understanding the shelving arrangement 16, description of the second side wall structure 24 is directed to an interior surface 62, as shown in FIG. 9. The interior surface 62 of the second side wall structure 24 extends upward from a second side of the floor structure 20 (opposite the first side) within the cargo area 14. The interior surface 62 also includes a plurality of protrusions and adjacent recesses that together define a plurality of surfaces that are further described below.

The interior surface 60 of the first side wall structure 22 and the interior surface 62 of the second side wall structure 24 face one another and are symmetrical with respect to one another. Put another way, the interior surface 60 and the interior surface 62 are identical to one another except that they are mirror images of one another. More specifically, each and every contour and shape of the interior surface 60 of the first side wall structure 22 is present on the interior surface 62 of the second side wall structure 22, except that the interior surface 62 is a mirror image of the interior surface 60. Therefore, the description below of the interior surface 60 of the first side wall structure 20 equally applies to the interior surface 62 of the second side wall structure 24. Consequently, for the sake of brevity, only the features of the interior surface 60 are described below, but apply equally to the interior surface 62.

More specifically, the various projections, recesses, surfaces and surface contours of the interior surface 60 described below are also provided on the interior surface 62 of the second side wall structure 24. The surfaces and surface contours of the interior surface 60 are aligned with the corresponding surfaces and surface contours of the interior surface 62. Consequently, the interior surface 62 of the second side wall structure 24 is provided with reference numerals identical to those of the interior surface 60 of the first side wall structure 24 since they function together.

As shown in FIGS. 8 and 10, the interior surface 60 (and the interior surface 62 in FIG. 9) is provided with a plurality of first or forward shelf supporting surfaces 70, 72a, 72b, 74a and 74b, a plurality of forward shelf guiding surfaces 80a, 80b, 80c, 80d, 80e, 80f, 82a, 82b, 82c, 82d, 82e, 82f and 82g, a plurality of second or aft shelf supporting surfaces 90, 92a, 92b, 94a, 94b, 94c, 94d and 94e, and a plurality of second or aft shelf guiding surfaces 96a, 96b, 96c, 96d, 98a, 98b, 98c, 98d and 98e. The forward shelf supporting surfaces 70, 72a, 72b, 74a and 74b all extend in a generally horizontal direction and face upward and are dimensioned to support the forward shelf 50, as described further below. The aft shelf supporting surfaces 90, 92a, 92b and 94a all include at least a surface portion that extends in a generally horizontal direction and face upward. The aft shelf supporting surfaces 90, 92a, 92b and 94a are dimensioned to support the aft shelf 52, as described further below. The aft shelf supporting surfaces 94b, 94c, 94d and 94e all include at least a surface portion that extends in a generally vertical direction.

Figure 11:
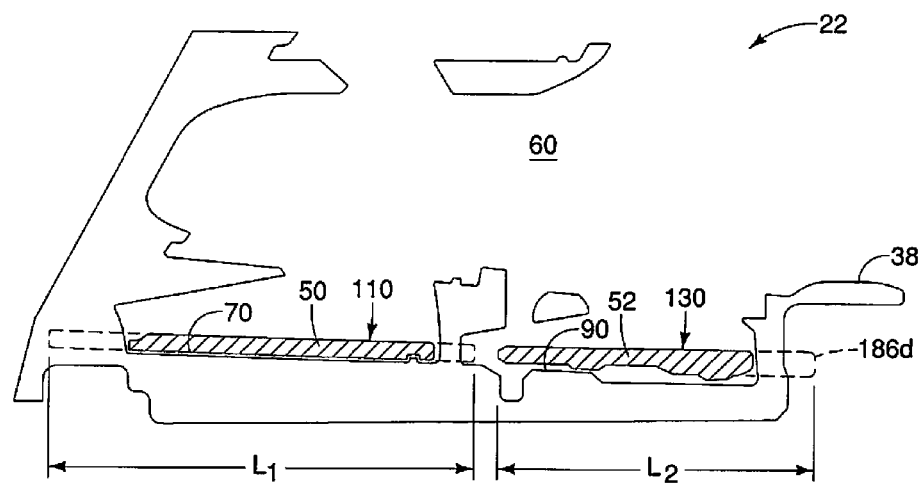
FIG. 11 is another schematic side view of the first side wall structure showing the shelf supporting surfaces and the shelf guiding surfaces with the forward shelf supported by one of the shelf supporting surfaces in a lower retention location and the aft shelf supported by one of the shelf supporting surfaces in a lower aft retention location in accordance with the first embodiment.

The forward shelf supporting surface 70 of each of the interior surface 60 of the first side wall structure 22 and the interior surface 62 of the second side wall structure 24 together define a lower retention location 110, as shown in FIG. 11 for supporting the forward shelf 50. The forward shelf supporting surfaces 72a and 72b of the interior surface 60 of the first side wall structure 22 and of interior surface 62 of the second side wall structure 24 together define a middle retention location 112 (FIG. 12) for the forward shelf 50. The forward shelf supporting surfaces 74a and 74b of the interior surface 60 of the first side wall structure 22 and of interior surface 62 of the second side wall structure 24 together define an upper retention location 114 (FIG. 13) for the forward shelf 50. As is described in greater detail below, the forward shelf 50 is easily moved between the lower retention location 110 and the middle retention location 112 and easily moved between the middle retention location 112 and the upper retention location 114 due to the shape and contours of the plurality of forward shelf guiding surfaces 80a, 80b, 80c, 80d, 82a, 82b, 82c, 82d, 82e, 82f and 82g.

Figure 14:
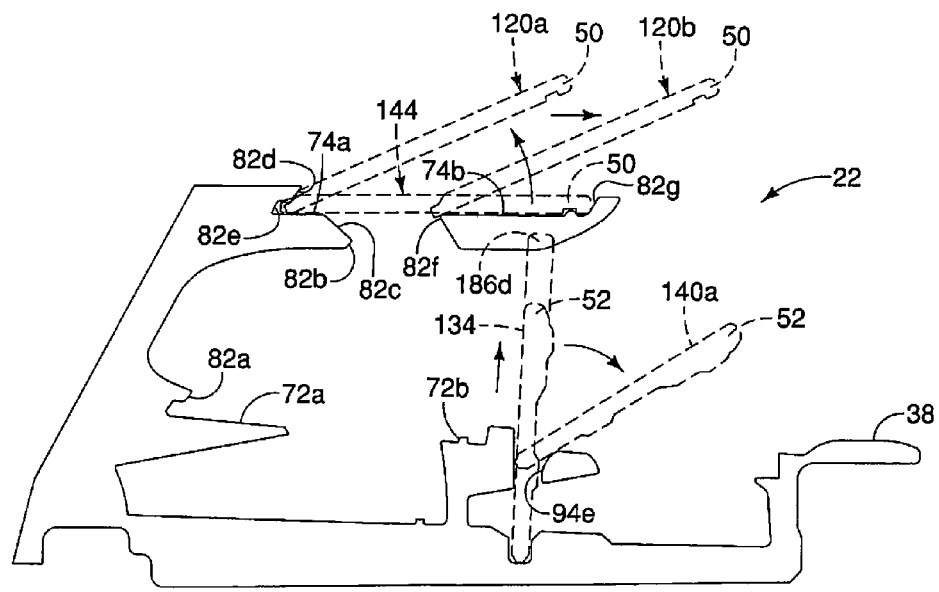
FIG. 14 is another schematic side view of the first side wall structure showing the shelf supporting surfaces and the shelf guiding surfaces with the forward shelf being moved from the upper retention location along a first movement path in a repositioning process, and the aft shelf being moved from the vertical retention location along an arcuate movement path in a repositioning process in accordance with the first embodiment.
Figure 15:
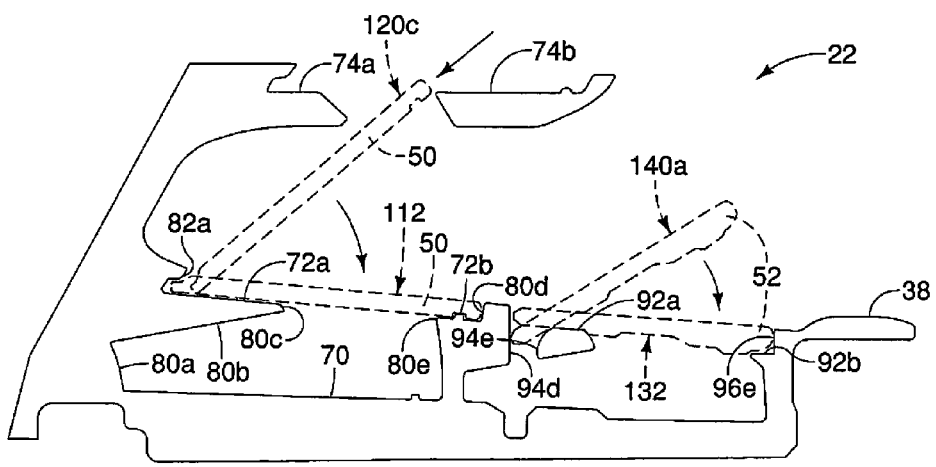
FIG. 15 is another schematic side view of the first side wall structure showing the shelf supporting surfaces and the shelf guiding surfaces with the forward shelf being moved along the first movement path to the middle retention location in the repositioning process, and the aft shelf being moved along the arcuate movement path to the upper aft retention location in the repositioning process in accordance with the first embodiment.

As shown in FIGS. 14 and 15, the plurality of forward shelf guiding surfaces 82a, 82b, 82c, 82d, 82e, 82f and 82g, define a first movement path with positions 120a-120b-120c between the middle retention location 112 and the upper retention location 114. Specifically, when the forward shelf 50 is to be moved from the upper retention location 114 to the middle retention location 112, the forward shelf 50 is lifted to the position 120a (an inclined orientation), then pulled rearward to the position 120b (an inclined orientation), as shown in FIG. 14. The guiding surface 82d prevents forward movement of the forward shelf 50 during this repositioning operation. The forward shelf 50 then contacts the guiding surface 82f and can be slid down along the guiding surface 82f to the position 120c shown in FIG. 15. The forward shelf 50 contacts the forward shelf supporting surface 72a and can then be slid forward to contact the forward shelf guiding surface 82a, then dropped into the middle retention location 112, as shown in FIG. 15. In order to move the forward shelf 50 from the middle retention location 112 to the upper retention location 114, the reverse movements are performed with the plurality of forward shelf guiding surfaces 82a, 82b, 82c, 82d, 82e, 82f and 82g guiding and limiting movement of the forward shelf 50.

Figure 16:
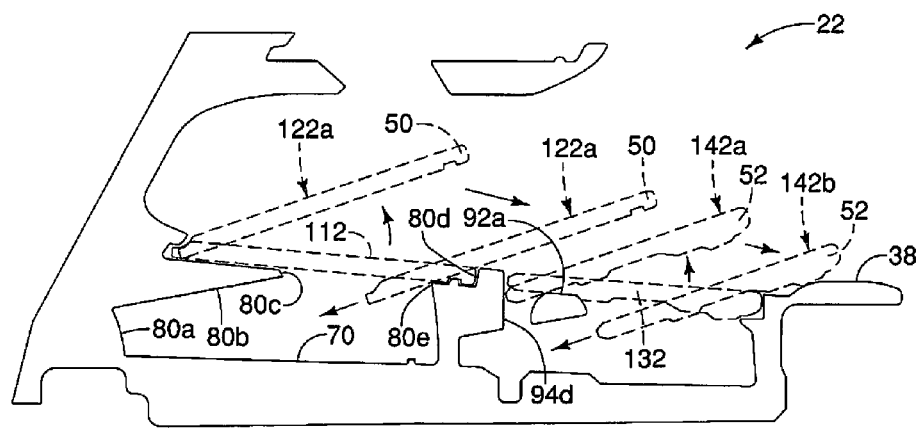
FIG. 16 is another schematic side view of the first side wall structure showing the shelf supporting surfaces and the shelf guiding surfaces with the forward shelf being moved from the middle retention location along a second movement path in another repositioning process, and the aft shelf being moved from the upper aft retention location along a rear movement path in another repositioning process in accordance with the first embodiment.
Figure 17:
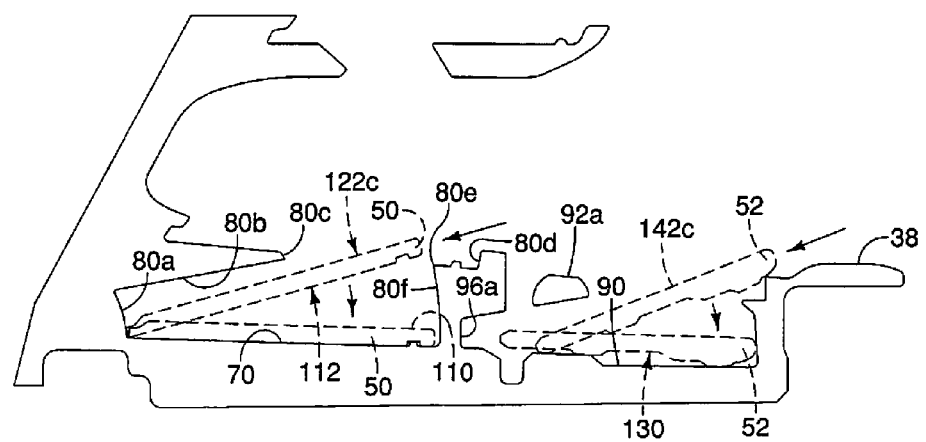
FIG. 17 is another schematic side view of the first side wall structure showing the shelf supporting surfaces and the shelf guiding surfaces with the forward shelf being moved along the second movement path to the lower retention location in the repositioning process, and the aft shelf being moved along the rear movement path to the lower aft retention location in the repositioning process in accordance with the first embodiment.

As shown in FIGS. 16 and 17, the plurality of forward shelf guiding surfaces 80a, 80b, 80c and 80d define a second movement path with positions 122a-122b-122c between the middle retention location 112 and the lower retention location 110. Specifically, as shown in FIG. 16, the forward shelf 50 is lifted from the middle retention location 112 to the position 122a (an inclined orientation), is then pulled rearward to the position 122b where the forward shelf 50 contacts the guiding surface 80e. Thereafter, as shown in FIG. 17, the forward shelf 50 is moved along the guiding surface 80e to the position 122c (an inclined orientation) when the forward shelf 50 contacts the guiding surface 80a. Thereafter, the forward shelf 50 can be dropped into the lower retention location 110 onto the forward shelf supporting surface 70. In order to move the forward shelf 50 from the lower retention location 110 to the middle retention location 112, the reverse movements are performed with the plurality of forward shelf guiding surfaces 80a, 80b, 80c, 80d, 80e and 80f guiding and limiting movement of the forward shelf 50.

Figure 12:
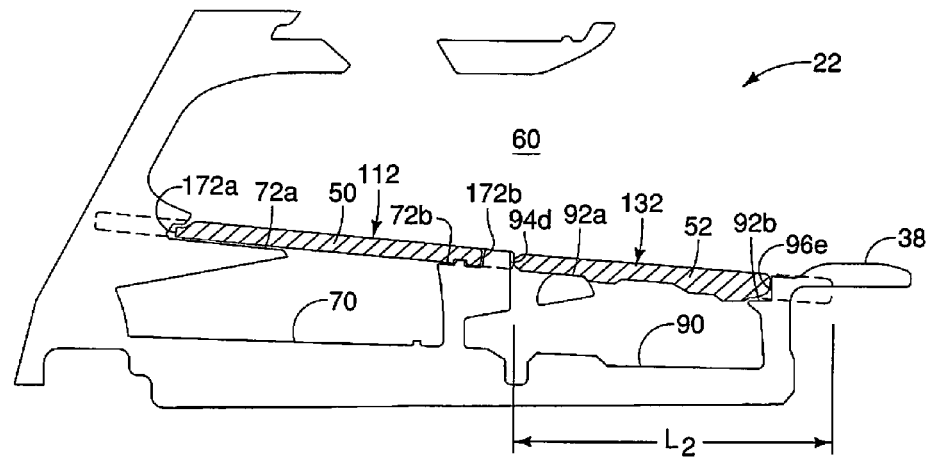
FIG. 12 is another schematic side view of the first side wall structure showing the shelf supporting surfaces and the shelf guiding surfaces with the forward shelf supported by several of the shelf supporting surfaces in a middle retention location and the aft shelf supported by several of the shelf supporting surfaces in an upper aft retention location in accordance with the first embodiment.
Figure 13:
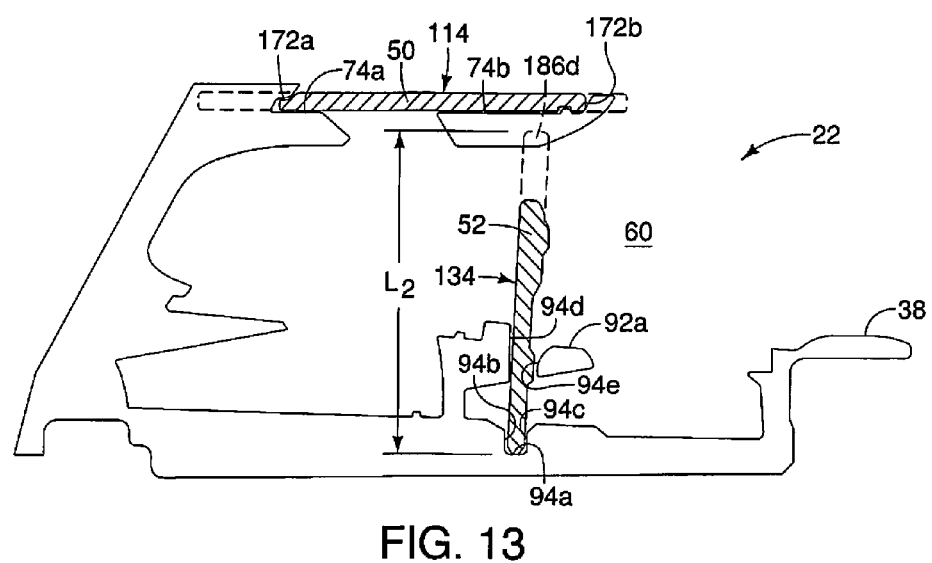
FIG. 13 is another schematic side view of the first side wall structure showing the shelf supporting surfaces and the shelf guiding surfaces with the forward shelf supported by several of the shelf supporting surfaces in an upper retention location and the aft shelf supported by several of the shelf supporting surfaces in a vertical retention location in accordance with the first embodiment.

The aft shelf supporting surface 90 of each of the interior surface 60 of the first side wall structure 22 and the interior surface 62 of the second side wall structure 24 together define a lower aft retention location 130 for the aft shelf 52, as shown in FIG. 11. The aft shelf supporting surfaces 92a and 92b define an upper aft retention location 132 for the aft shelf 52, as shown in FIG. 12. The aft shelf supporting surfaces 94a, 94b, 94c, 94d and 94e define a vertical retention location 134 for the aft shelf 52, as shown in FIG. 13.

The aft shelf supporting surface 94d is an upright vertical surface. The aft shelf guiding surface 94e has an arcuate shape that facilitates arcuate movement of the aft shelf 52. Together, the aft shelf supporting surface 94d and the aft shelf guiding surface 94e define an arcuate movement path with a position 140a between the vertical retention location 134 and the upper aft retention location 132, as shown in FIGS. 14 and 15. As shown in FIG. 14, the aft shelf 50 can be moved from the vertical retention location 134 to the upper aft retention location 132 by lifting the aft shelf 52 upward slightly from the vertical retention location 134 and allowing the aft shelf 52 to pivot along the aft shelf guiding surface 94e to the position 140a. Thereafter, the aft shelf 52 is lowered from the position 140a to the upper aft retention location 132, as shown in FIG. 15. The surfaces 94d and 96e prevent forward and rearward movement, respectively, of the aft shelf 52 once the aft shelf 52 is in the upper aft retention location 132, as shown in FIG. 15.

In order to move the aft shelf 52 from the upper aft retention location 132 to the vertical retention location 134, the reverse movements are performed.

The aft shelf guiding surfaces 96a, 96b, 96c, 96d and 96e define a rear movement path that includes positions 142a-142b-142c between the upper aft retention location 132 and the lower aft retention location 130, as shown in FIGS. 16 and 17. Specifically, in order to move the aft shelf 52 from the upper aft retention location 132 to the lower aft retention location 130, the aft shelf 52 is lifted to the position 142a (an inclined orientation), as shown in FIG. 16. Thereafter, the aft shelf 52 is pulled gently rearward to the position 142b until the aft shelf 52 drops downward off the aft shelf supporting surface 92a, as is also shown in FIG. 16. Thereafter, the aft shelf 52 is slid forward along the aft shelf supporting surface 90 passing forward through the position 142c (an inclined orientation) until the aft shelf 52 can be dropped to the lower aft retention location 130, as shown in FIG. 17. In order to move the aft shelf 52 from the lower aft retention location 130 to the upper aft retention location 132, the reverse movements are performed.

Figure 18:
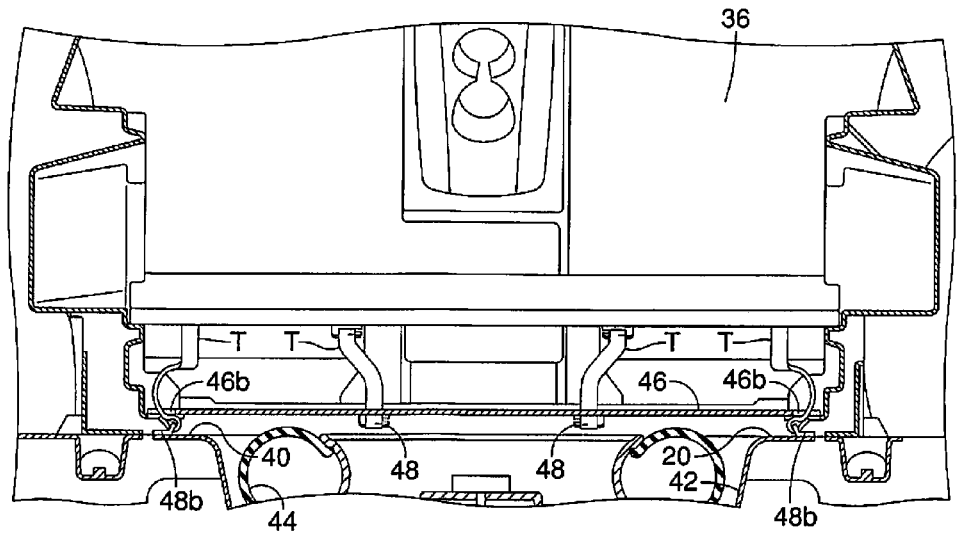
FIG. 18 is a rear cut-away view of the cargo area showing the floor structure, a concealed cargo space hidden by the deck panel, tether clips and tethers removably attached to the forward shelf in accordance with the first embodiment.

A description is now provided of the tether clips 48a and 48b, and of tethers T with specific reference to FIGS. 18-22. As shown in FIGS. 18 and 19, two tether clips 48a are located adjacent to the rear seat assembly 32 and are fixed to the floor structure 20 by, for example, mechanical fasteners such as a nut and bolt arrangement or a rivet. Two tether clips 48b are located on opposite sides of the concealed cargo space 42, and are also fixed to the floor structure 20 by, for example, mechanical fasteners such as a nut and bolt arrangement or a rivet. First ends of tethers T are releasably attached to the tether clips 48a and second ends of the tethers T are releasably attached to tether clips 48c located on the forward shelf 50, as described further below. The tethers T are dimensioned such that when the tethers T are attached to the tether clips 48a and 48c, movement of the forward shelf 50 is restricted within the cargo area 14. However, the tethers T have sufficient length such that the forward shelf 50 can move easily between the lower, middle and upper retention locations 110, 112 and 114 along the first and second movement paths. As mentioned above and shown in FIG. 6, the deck panel 46 includes recesses 46a. The tethers T extend from the tether clips 48a, through the recesses 46a and up to the tether clips 48c on the forward shelf 50.

Figure 21:
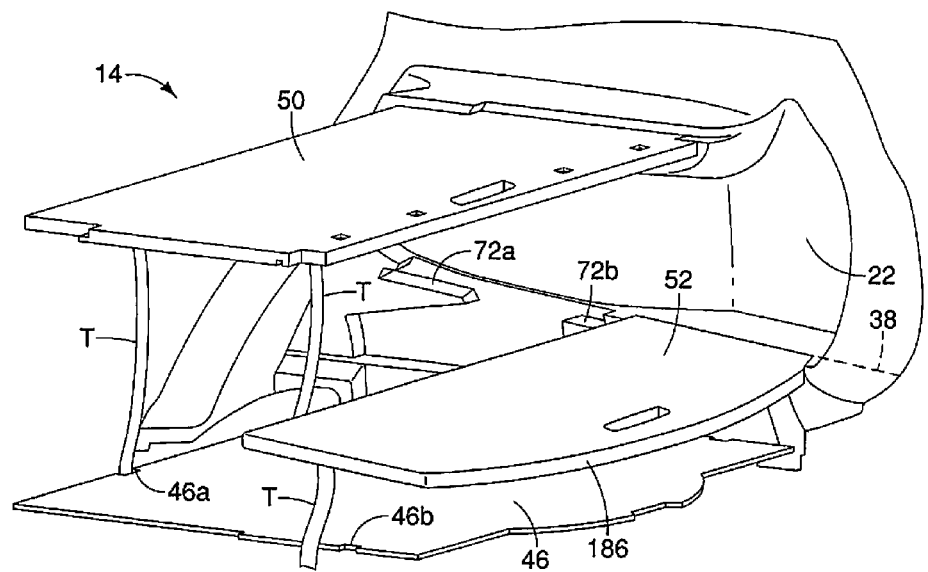
FIG. 21 is a perspective view of the cargo area showing the deck panel, the forward shelf in the upper retention location and the aft shelf in the upper aft retention location, with the tethers coupled thereto in accordance with the first embodiment.
Figure 22:
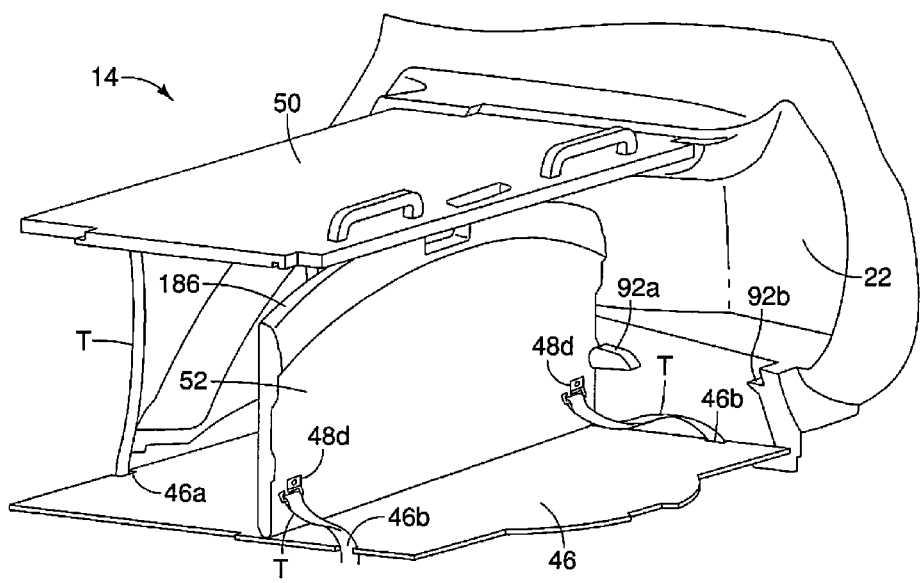
FIG. 22 is another perspective view of the cargo area similar to FIG. 21 showing the deck panel, the forward shelf in the upper retention location and the aft shelf in the vertical retention location, with the tethers coupled thereto in accordance with the first embodiment.

More specifically, as shown in FIGS. 21 and 22, the tethers T attached to the tether clips 48a and 48c restrict movement of the forward shelf 50 such that the forward shelf 50 can be easily moved along the first and second movement paths between the lower retention location 110, the middle retention location 112 and the upper retention location 114. However, the forward shelf 50 cannot be removed from the cargo area 14 when the tethers T are coupled to the tether clips 48*a* and 48*c*. Only after the tethers T are unhooked from the tether clips 48*a* and 48*c*, can the forward shelf 50 be removed from the cargo area 14 and the vehicle 10, if desired.

Similarly, first ends of the rearward tethers T are releasably attached to the tether clips 48*b* and second ends of the tethers T are releasably attached to tether clips 48*d* located on the aft shelf 52. The tethers T are dimensioned such that when the tethers T are attached to the tethers 48*b* and 48*d*, movement of the aft shelf 52 is restricted within the cargo area 14. However, the tethers T have sufficient length such that the aft shelf 52 can move easily between the lower and upper aft retention locations 130 and 132 and can move freely to the vertical retention location 134. As mentioned above and shown in FIG. 6, the deck panel 46 includes recesses 46*b*. The tethers T extend from the tether clips 46*b*, through the recesses 46*b* and up to the tether clips 48*d* on the aft shelf 52.

More specifically, as shown in FIGS. 21 and 22, the tethers T attached to the tether clips 48*b* and 48*d* restrict movement of the aft shelf 52 such that the aft shelf 52 can be easily moved along the rear movement path and the arcuate movement path between the lower aft retention location 130, the upper aft retention location 132 and the vertical retention location 134. However, the aft shelf 52 cannot be removed from the cargo area 14 when the tethers T are coupled to the tether clips 48*b* and 48*d*. Only after the tethers T are unhooked from the tether clips 48*b* and 48*d*, can the aft shelf 52 be removed from the cargo area 14 and the vehicle 10, if desired.

A description of the forward shelf 50 is now provided with specific reference to FIGS. 23-30. The forward shelf 50 is preferably made of a rigid foam material coated or covered by a further rigid material such as a plastic, resin and/or polymer material. The forward shelf 50 has an upper surface 160, a lower surface 162 and a handle portion 164. The handle portion 164 is basically an opening that extends from the upper surface 160 to the lower surface 162. The handle portion 164 extends in a vehicle lateral direction (side to side) for ease of gripping by the hand of a vehicle operator, allowing free movement of the forward shelf 50 between the lower, middle and upper retention locations 110, 112 and 114.

Figure 23:
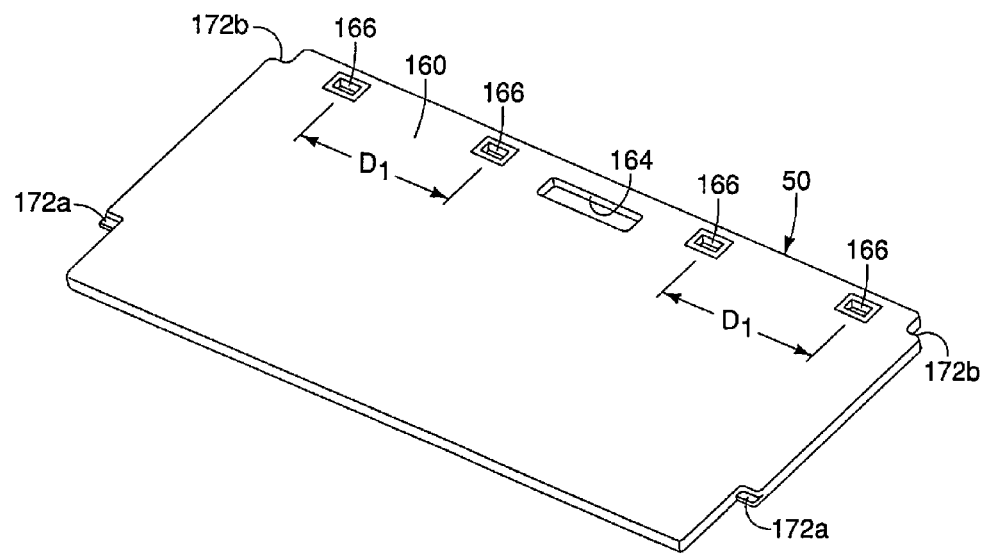
FIG. 23 is a perspective view of the forward shelf shown removed from the vehicle showing an upper surface that includes fastening structures that receive removable bar members in accordance with the first embodiment.

The upper surface 160 of the forward shelf 50 also includes first fastening structures defined by apertures 166. There are two pairs of apertures 166, each pair of apertures 166 defining one of the first fastening structures, as described below. As shown in FIG. 23, the apertures 166 in each pair of apertures 166 are spaced apart from one another by a distance $D_1$.

Figure 24:
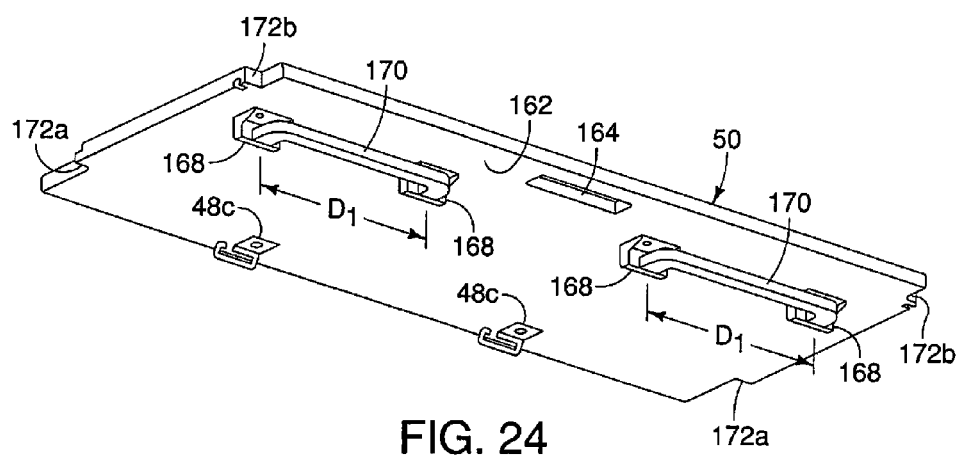
FIG. 24 is a perspective view of the forward shelf shown removed from the vehicle showing a lower surface that also includes fastening structures that receive removable bar members, with the removable bar members in a stowed orientation along the lower surface of the forward shelf in accordance with the first embodiment.
Figure 30:
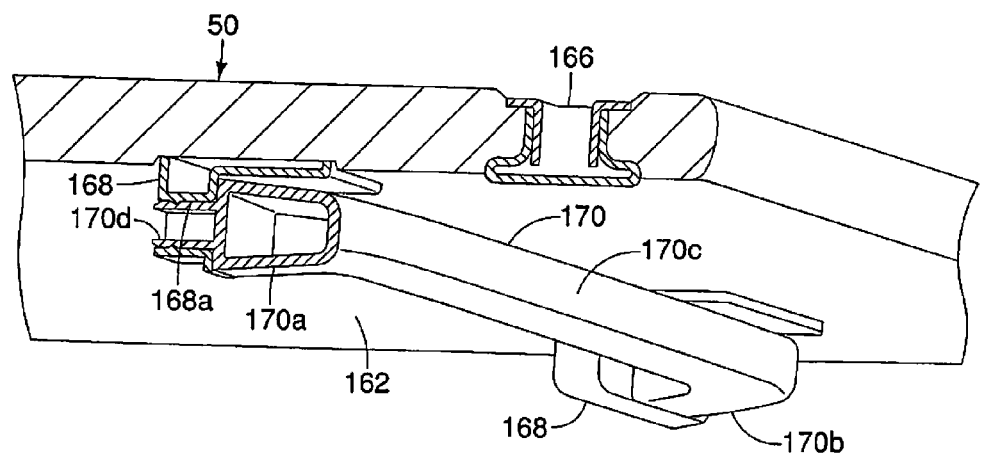
FIG. 30 is a cross-sectional perspective view of the forward shelf showing the lower surface and the fastening structures with one of the removable bar members attached to the fastening structures on the lower surface in accordance with the first embodiment.

The lower surface 162 of the forward shelf 50 includes second fastening structures defined by projections 168 and further includes two of the tether retaining clips 48*c*, as shown in FIGS. 24-26 and 28. As shown in FIG. 30, each of the projections 168 includes an aperture 168*a*. There are two pairs of the projections 168, each pair of projections 168 defining a second fastening structure. As shown in FIG. 24, the apertures 168*a* in each pair of apertures 168*a* are spaced apart from one another by the distance $D_1$, corresponding to the distance between the apertures 166.

Figure 26:
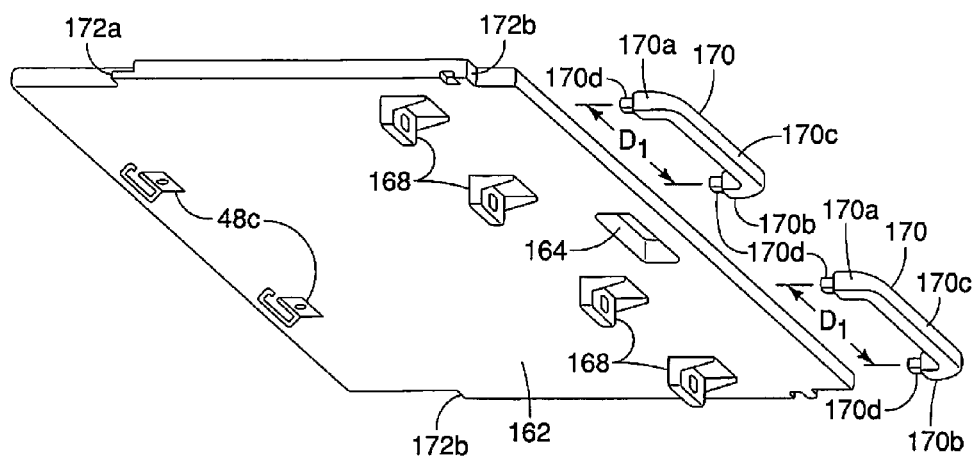
FIG. 26 is an exploded perspective view of the forward shelf showing the lower surface and the fastening structures with the removable bar members detached from the fastening structure in accordance with the first embodiment.

The forward shelf 50 also includes at least one removable member 170 (a bar member). In the depicted embodiment, there are two of the removable members 170. Each removable member 170 includes a first end 170*a*, a second end 170*b* and a bar section 170*c* that extends between the first end 170*a* and the second end 170*b*. Each of the first end 170*a* and the second end 170*b* includes a snap-fitting projection 170*d*. Hence, each removable member 170 includes two snap-fitting projections 170*d*. As shown in FIG. 26, the snap-fitting projections 170*d* are spaced apart from one another by the distance $D_1$, corresponding to the distance between the apertures 166 and the apertures 168*a*.

Figure 25:
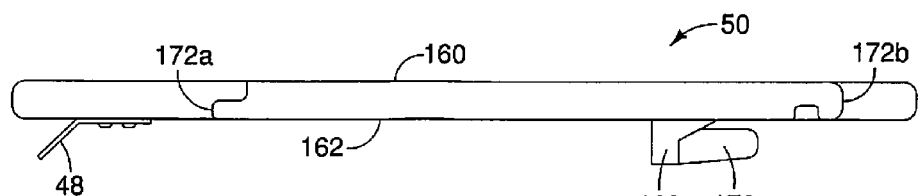
FIG. 25 is a side view of the forward shelf showing the removable bar members in a stowed orientation along the lower surface in accordance with the first embodiment.
Figure 28:
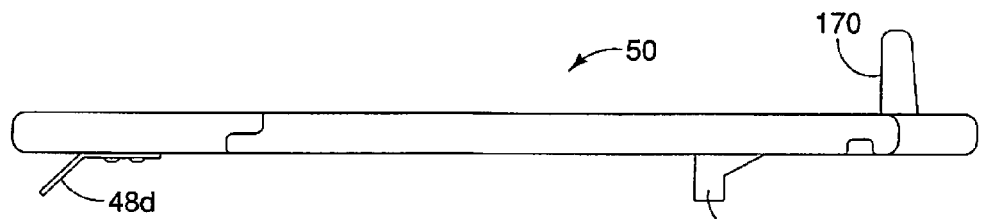
FIG. 28 is another side view of the forward shelf similar to FIG. 25 showing the removable bar members in the cargo movement restricting orientation along the upper surface in accordance with the first embodiment.
Figure 29:
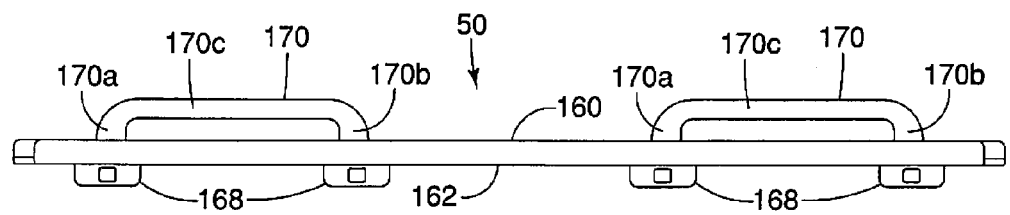
FIG. 29 is a rear view of the forward shelf showing the removable bar members in the cargo movement restricting orientation along the upper surface in accordance with the first embodiment.

The apertures 166 in the upper surface 160 and the apertures 168*a* in the projections 168 of the lower surface 162 are dimensioned to removably receive and retain the snap-fitting projection 170*d* of each removable member 170. The snap-fitting projections 170*d* basically define releasable fastener structures dimensioned such that the removable member 170 can be freely moved between two locations: a cargo movement restricting orientation corresponding to attachment to the apertures 166 in the upper surface 160 as shown in FIGS. 27, 28 and 29; and a stowed orientation corresponding to attachment to the apertures 168*a* in the projections 168 along the lower surface 162, as shown in FIGS. 24, 25 and 30.

More specifically, when the removable member 170 is installed in the cargo movement restricting orientation (FIGS. 27-29), the removable member 170 extends along the upper surface 160 of the forward shelf 50 and can limit the movement of cargo placed on the upper surface 160 of the forward shelf 50. In the cargo movement restricting orientation, the bar section 170*c* is spaced apart from the upper surface 160 and is parallel to the upper surface 160.

When the removable members 170 are each in the stowed orientation adjacent to the lower surface 162 of the forward shelf 50, the removable members 170 are partially hidden from view and are not obtrusive. With the forward shelf 50 in either of the middle retention location 112 or the upper retention location 114, the removable members 170 are easily accessed when in the stowed orientation, such that they can be pulled out of the apertures 168*a* and moved to the cargo movement restricting orientation.

Figure 27:
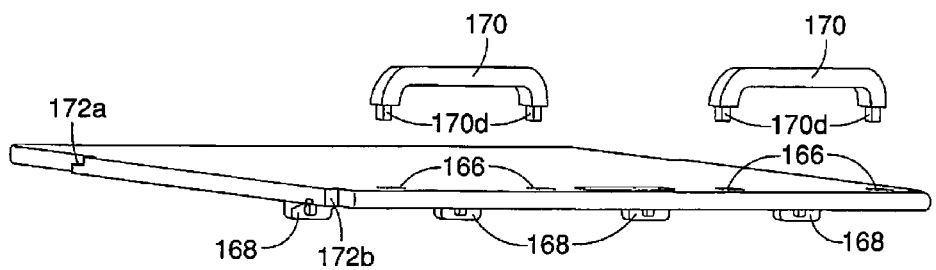
FIG. 27 is another exploded perspective view of the forward shelf showing the upper surface and the fastening structures with the removable bar members detached from the fastening structures positioned for attachment in a cargo movement restricting orientation in accordance with the first embodiment.

With the forward shelf 50 in any one of the lower retention location 110, the middle retention location 112 or the upper retention location 114, and the removable members 170 being in the cargo movement restricting orientation the snap-fitting projections 170*d* extend in a vertical direction, as shown in FIG. 27. Further, with the removable members 170 being in the stowed orientation the snap-fitting projections 170*d* extend in a horizontal direction, as shown in FIG. 30. In other words, any one of the side surfaces of the removable member 170 can be considered a main surface of the removable member. That main surface of the removable member 170 extends in a first direction with the removable member 170 in the cargo movement restricting orientation and that main surface of the removable member 170 extends in a second direction perpendicular to the first direction with the removable member 170 in the stowed orientation.

The first end 170*a*, the second end 170*b*, the bar section 170*c* and the snap-fitting projections 170*d* are all formed unitarily as a single, monolithic element. Further, the first end 170*a*, the second end 170*b*, the bar section 170*d* and the snap-fitting projections 170*d* of the removable member 170 are angularly offset from one another such that they define a C-shape when viewed along a side surface thereof.

The removable members 170 have the appearance of being removable handles. However, the removable members 170 are not specifically designed to be handles. Rather, the removable members 170 are specifically intended to be used to limit the movement of cargo placed upon the upper surface 160 of the forward shelf 50.

Further, with the seatback 36 of the rear seat assembly 32 in the upright orientation, and with the removable members 170 in the cargo movement restricting orientation, the forward shelf 50, the removable members 170, the seatback 36 and portions of the first and second side wall structures 22 and 24 define a storage space within the cargo area 14 that restricts horizontal movement of cargo placed on the forward shelf 50.

The forward shelf 50 has a generally rectangular shape, as shown in FIGS. 23 and 24. However, each of the four corners of the forward shelf 50 includes a notch or recess. Specifically, the forward corners include recesses 172a and the rearward corners include recesses 172b. It should be understood from, for example, FIGS. 11, 12 and 13, that the cross sectional depiction of the forward shelf 50 is taken at the recesses 172a and 172b. In other words, the forward shelf 50 has an overall length that is greater than that depicted in FIGS. 11, 12 and 13. The actual overall length $L_1$ of the forward shelf 50 is shown in FIG. 11, with those sections cut off by the recesses 172a and 172b being shown with phantom lines.

Figure 31:
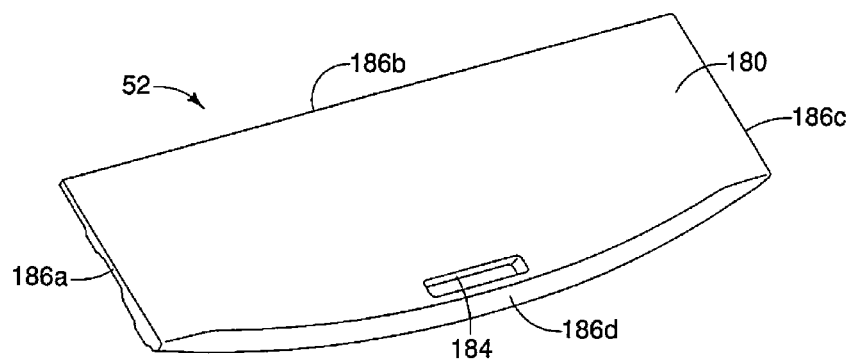
FIG. 31 is a perspective view of the aft shelf showing the upper surface in accordance with the first embodiment.
Figure 32:
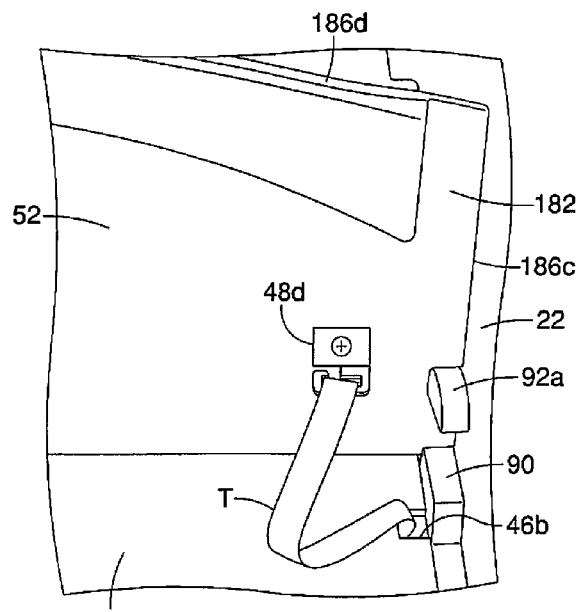
FIG. 32 is a perspective view of the cargo area showing the deck panel and the aft shelf with the aft shelf in the vertical retention location and further showing one of the tethers connected to the aft shelf in accordance with the first embodiment.
Figure 33:
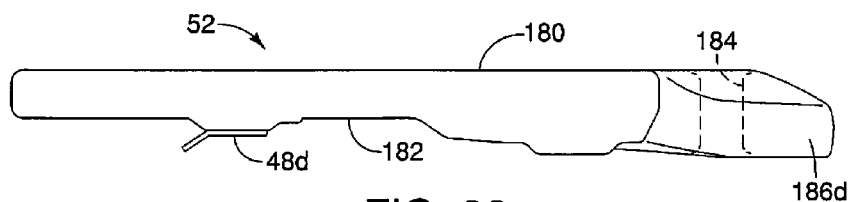
FIG. 33 is a side view of the aft shelf showing the tether clips attached to a lower surface thereof in accordance with the first embodiment.

A description of the aft shelf 52 is now provided with specific reference to FIGS. 31, 32 and 33. The aft shelf 52 has an upper surface 180 and a lower surface 182. Reference to the upper surface 180 and the lower surface 182 is relative to the aft shelf 52 being in either of the lower aft retention location 130 (FIG. 11) and the upper aft retention location 132 (FIG. 12). The aft shelf 52 further includes a handle portion 184 and a peripheral edge including edge portions 186a, 186b, 186c and 186d. The handle portion 184 is defined by an aperture that extends from the upper surface 180 to the lower surface 182. The handle portion 184 is formed adjacent to the edge 186d of the aft shelf 52.

The handle portion 184 extends in a vehicle lateral direction, side to side, for ease of gripping by the hand of a vehicle operator, allowing free movement of the forward shelf 50 between the lower aft retention location 130, the upper aft retention location 132 and the vertical retention location 134.

The aft shelf 52 has an overall rectangular shape as defined by the edge portions 186a, 186b and 186c. However, the edge portion 186d has an arcuate or curved contour, as shown in FIGS. 21, 22 and 31. It should be understood that the depiction in FIGS. 11-13 shows the aft shelf 52 in a cross-section taken adjacent to the edge portion 186c. Hence, due to the curvature of the edge portion 186d, the cross-section of the aft shelf 52 in FIGS. 11-13 gives the appearance of the aft shelf 52 being smaller. Therefore, in FIGS. 11, 12 and 13, the actual overall length $L_2$ of the aft shelf 52 is shown with the edge portion 186d being depicted in phantom.

Figure 7:
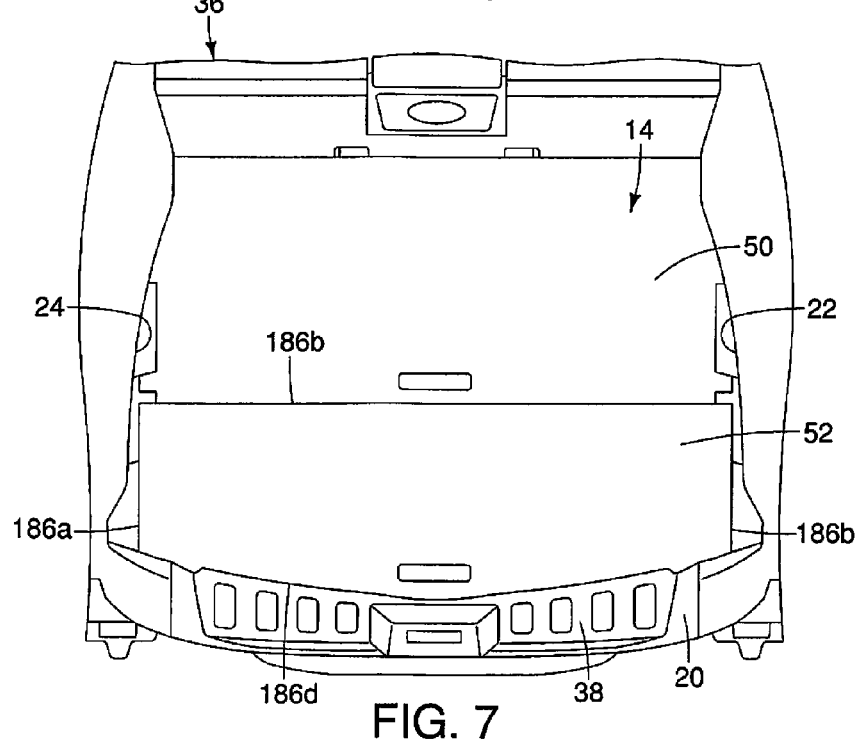
FIG. 7 yet another a rear perspective view showing the cargo area with the forward shelf and the aft shelf installed covering the deck panel in accordance with the first embodiment.

The curvature of the edge portion 186d mates with, the curvature of the sill section 38 of the rear hatch opening 28, as shown in FIGS. 2 and 7. Thus, when the forward shelf 50 is in the middle retention location 112 and the aft shelf 52 is in the upper aft retention location 132, the upper surfaces of the forward shelf 50 and the aft shelf 52 are parallel to one another and approximately parallel to the surface of the sill section 38, as shown in FIGS. 2 and 5.

The lower surface 182 of the aft shelf 52 includes two of the tether clips 48d, as shown in FIGS. 32 and 33.

The shelving arrangement 16 is further explained with the following description of the various combinations of positions and orientations of the forward shelf 50, the aft shelf 52 and the seatback 36, with specific reference to FIGS. 34 thru 53.

In FIGS. 34 thru 43, the seatback 36 is in the upright orientation or seating orientation thereby defining a forward boundary for the cargo area 14. In FIGS. 44 thru 53, the seatback 36 is in the folded orientation, thus extending or enlarging the cargo area 14. In each of the depicted orientations, the forward shelf 50 and the aft shelf 52 extend from the first side wall structure 22 to the second side wall structure 24, and are resting on the shelf supporting surfaces of the first side wall structure 22 and the second side wall structure 24, as described above.

In FIGS. 8, 9, 11, 34 and 44, the forward shelf 50 is in the lower retention location 110 and the aft shelf 52 is in the lower aft retention location 130. In these retention locations, the forward shelf 50 and the aft shelf 52 are co-planar. This configuration of the shelving arrangement 16 maximizes the cargo capacity of the cargo area 14.

Figure 35:
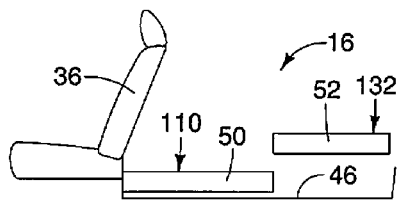

In FIGS. 35 and 45, the forward shelf 50 is in the lower retention location 110 and the aft shelf 52 is in the upper aft retention location 132. In this configuration, the forward shelf 50 and the aft shelf 52 are not co-planar. Rather, the aft shelf 52 is slightly higher than the forward shelf 50. Any cargo placed on the upper surface of the forward shelf 50 will have limited movement due to the seatback 36 and the aft shelf 52 being above the level of the forward shelf 50.

Figure 36:
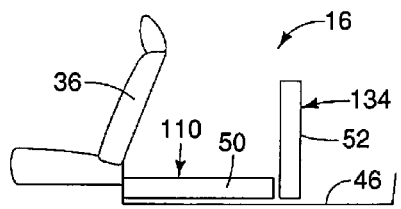
Figure 46:
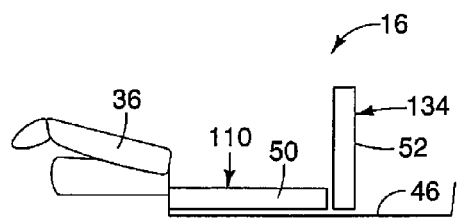

In FIGS. 36 and 46, the forward shelf 50 is in the lower retention location 110 and the aft shelf 52 is in the vertical retention location 134. In this configuration, the forward shelf 50 and the aft shelf 52 are perpendicular to one another.

Figure 37:
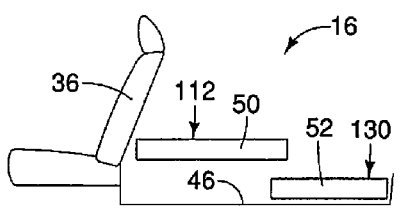
Figure 47:
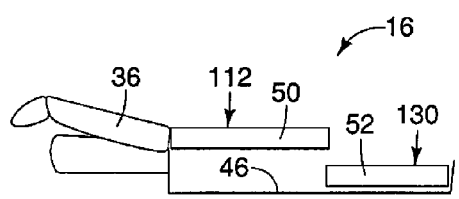

In FIGS. 37 and 47, the forward shelf 50 is in the middle retention location 112 and the aft shelf 52 is in the lower aft retention location 130. In this configuration, the forward shelf 50 and the aft shelf 52 are parallel to one another, but vertically offset from one another. Specifically, the forward shelf 50 is higher than the aft shelf 52.

Figure 38:
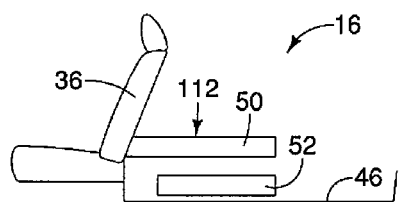
Figure 48:
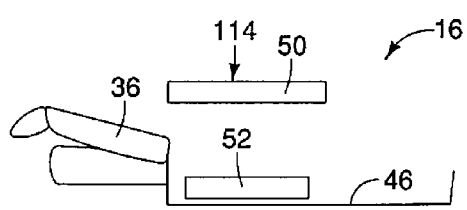

In FIG. 38, the forward shelf 50 is in the middle retention location 112 and the aft shelf 52 is stowed underneath the forward shelf 50. In FIG. 48, the forward shelf 50 is in the upper retention location 114 and the aft shelf 52 is again stowed underneath the forward shelf 50.

Figure 39:
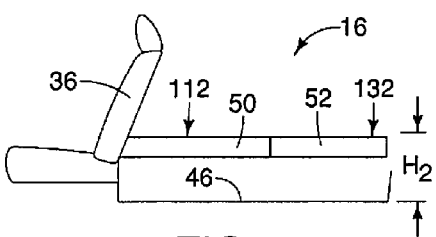
Figure 49:
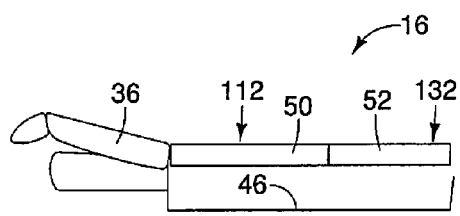

In FIGS. 39 and 49, the forward shelf 50 is in the middle retention location 112 and the aft shelf 52 is in the upper aft retention location 132. In this configuration, the forward shelf 50 and the aft shelf 52 are co-planar. Further, in FIG. 49, the seatback 36, the forward shelf 50 and the aft shelf 52 are approximately aligned (approximately co-planar) such that a back-side surface of the seatback 36 and the upper surfaces of the forward shelf 50 and the aft shelf 52 define an extended approximately planar cargo receiving surface.

Figure 50:
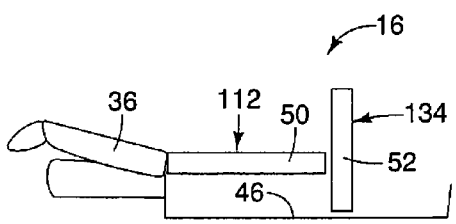

In FIGS. 40 and 50, the forward shelf 50 is in the middle retention location 112 and the aft shelf 52 is in the vertical retention location 134. In this configuration, the forward shelf 50 and the aft shelf 52 are perpendicular to one another. Further, the aft shelf 52 serves to box in and enclose an area beneath the forward shelf 50. Hence, the area under the forward shelf 50 is a hidden or concealed storage space.

Figure 51:
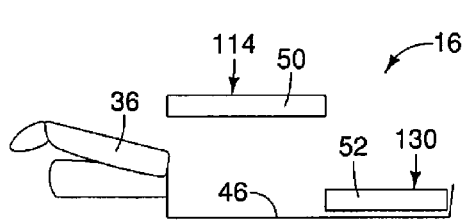

In FIGS. 41 and 51, the forward shelf 50 is in the upper retention location 114 and the aft shelf 52 is in the lower aft retention location 130. In this configuration, the forward shelf 50 and the aft shelf 52 are parallel to one another, but vertically offset from one another with the forward shelf 50 being higher than the aft shelf 52.

Figure 52:
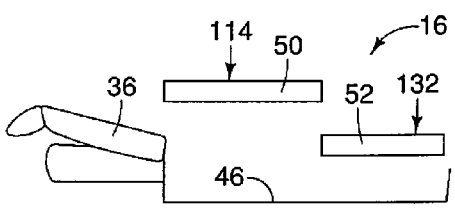

In FIGS. 42 and 52, the forward shelf 50 is in the upper retention location 114 and the aft shelf 52 is in the upper aft retention location 132. In this configuration, the forward shelf 50 and the aft shelf 52 are again parallel to one another, but vertically offset from one another with the forward shelf 50 being higher than the aft shelf 52.

Figure 53:
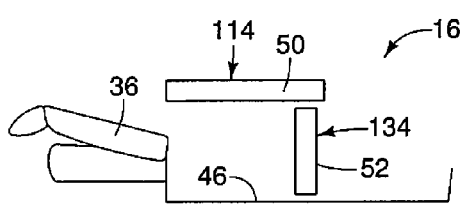

In FIGS. 43 and 53, the forward shelf 50 is in the upper retention location 114 and the aft shelf 52 is in the vertical retention location 134. In this configuration, the forward shelf 50 and the aft shelf 52 are perpendicular to one another. Further, the aft shelf 52 serves to box in and enclose an area beneath the forward shelf 50. Hence, the area under the forward shelf 50 is a completely hidden or completely concealed storage space that is larger than the concealed storage space defined in FIGS. 40 and 50. It should further be understood from FIG. 43, that the back or rearward surface of the seatback 36, the forward shelf 50 and the aft shelf 52 define a completely enclosed storage space between the first and second side surface structures 22 and 24.

Figure 34:
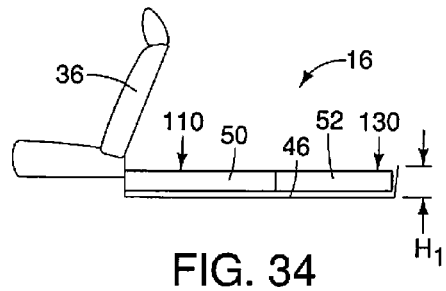

As is shown in FIGS. 34 and 42, when the forward shelf 50 is in the lower retention location 110 and the aft shelf 52 is in the lower aft retention location 130, the respective upper surfaces of the forward shelf 50 and the aft shelf 52 are located a distance $H_1$ above the deck panel 46 (and the upper surface of the floor structure 20). As shown in FIGS. 39 and 42, when the forward shelf 50 is in the middle retention location 112 and the aft shelf 52 is in the upper aft retention location 132, the respective upper surfaces of the forward shelf 50 and the aft shelf 52 are located a distance $H_2$ above the deck panel 46. As shown in FIGS. 41 and 42, when the forward shelf 50 is in the upper retention location 114, the upper surface of the forward shelf 50 is located a distance $H_3$ above the deck panel 46. As is shown in FIG. 42, the distance $H_3$ is greater than the distance $H_2$. Further, the distance $H_2$ is greater than the distance $H_1$.

As shown in FIGS. 22, 43 and 53, with the forward shelf 50 in the upper retention location 114 and the aft shelf 52 in the vertical retention location 134, the aft shelf 52 is entirely beneath the forward shelf 50. Hence, the edge portion 186d extends up to a point just below the lower surface 162 of the forward shelf 50. In other words, as shown in FIG. 22, an uppermost portion (the edge portion 186d) of the aft shelf 52 extends below the forward shelf 50.

Figure 54:
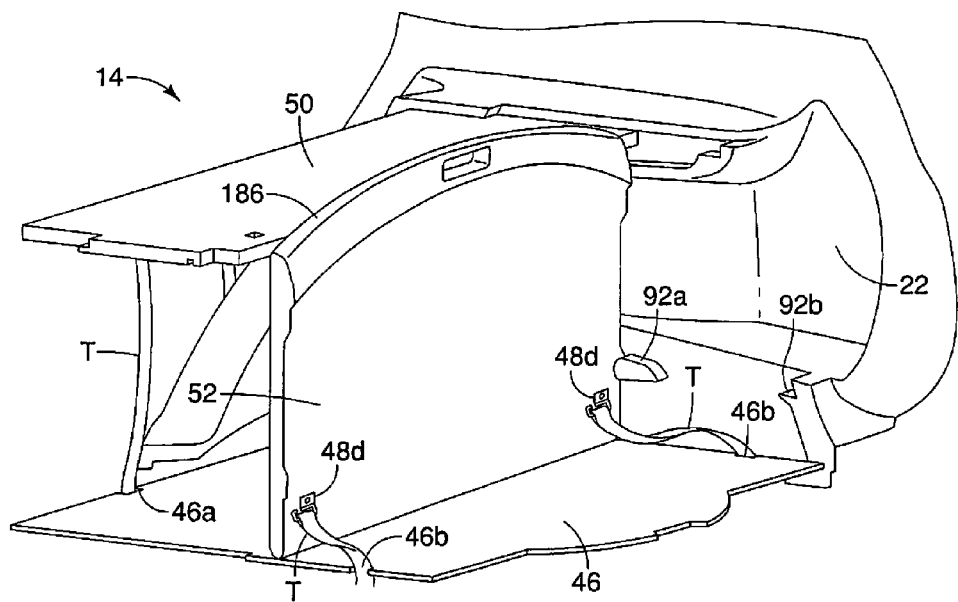
FIG. 54 is a perspective view of the cargo area similar to FIG. 22 showing the deck panel, the forward shelf in the upper retention location and the aft shelf in the vertical retention location, with the tethers coupled thereto, where the shelf supporting surfaces and the shelf guiding surfaces have been modified such that an uppermost edge of the aft shelf extends above the forward shelf in accordance with a modification of the first embodiment.
Figures 55, 56:
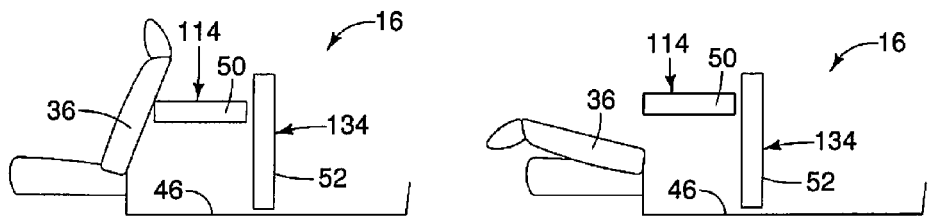
FIG. 55 is a schematic side view of the cargo area similar to FIG. 43 showing the seatback of the rear seat in the upright orientation, the forward shelf in the upper retention location and the aft shelf in the vertical retention location in accordance with the modification of the first embodiment.
FIG. 56 is a schematic side view of the cargo area similar to FIG. 53, with the seatback of the rear seat in the folded orientation, the forward shelf in the upper retention location and the aft shelf in the vertical retention location in accordance with the modification of the first embodiment.

It should be understood from the drawings and the description herein that the shelf supporting surfaces of the first and second side wall structures 22 and 24 can be modified and re-positioned such that any of a variety of relative retention locations of the forward shelf 50 and the aft shelf 52 can be achieved. For example, as shown in FIGS. 54, 55 and 56 depicting a modification of the first embodiment, with the forward shelf 50 in the upper retention location 114 and the aft shelf 52 in the vertical retention location 134, an uppermost portion (the edge portion 186d) of the aft shelf 52 extends above the forward shelf 50. The modification to the first embodiment shown in FIGS. 54-56 only show the forward shelf 50 in the upper retention location 114 and the aft shelf 52. The schematic representations in FIGS. 34-42 and 44-52 of the positioning of the forward shelf 50 and the aft shelf 52 also apply to the modification to the first embodiment.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure, comprising:
a vehicle floor;
a first side wall structure extending upward from a first side of the vehicle floor;
a second side wall structure extending upward from a second side of the vehicle floor opposite the first side wall structure, the vehicle floor, the first side wall structure and the second side wall structure at least partially defining a vehicle cargo area, the first side wall structure and the second side wall structure each having a plurality of protrusions, the plurality of protrusions being non-movable;
a rear seat fixedly attached to the vehicle floor and having a seatback movable between an upright orientation and a folded orientation, a back surface of the seatback at least partially defining the vehicle cargo area with the seatback in the upright orientation;
a forward shelf having an upper surface and a lower surface with a forward edge extending between the upper surface and the lower surface and a rearward edge extending between the upper surface and the lower surface, the forward shelf extending from the first side wall structure to the second side wall structure within the vehicle cargo area, the forward shelf being movable between a first retention location and a second retention location, the first retention location being defined by a first horizontal and a first upright surface of a first one of the plurality of protrusions and a second horizontal surface and a second upright surface of a second one of the plurality of protrusions, the second retention location being defined by a third horizontal and a third upright surface of a third one of the plurality of protrusions and a fourth horizontal surface and a fourth upright surface of a fourth one of the plurality of protrusions, the first retention location being defined a first distance above the vehicle floor, the second retention location being defined at a second distance above the vehicle floor, the second distance being greater than the first distance such that with the forward shelf in the second retention location the forward shelf is located proximate an upper end of the seatback with the seatback in the upright orientation, and with the forward shelf in the second retention location the forward edge of the forward shelf contacts the third upright surface and a rearward edge of the forward shelf contacts the fourth upright surface restricting horizontal movement of the forward shelf; and an aft shelf extending from the first side wall structure to the second side wall structure within the vehicle cargo area adjacent to the forward shelf, the aft shelf being movable between a horizontal retention location and a vertical retention location, the horizontal retention location being defined by a fifth horizontal surface of a fifth one of the plurality of protrusions, the vertical retention location being defined by a fifth upright surface of the fifth one of the plurality of protrusions and a sixth upright surface of the second one of the plurality of protrusions, of the first and second side wall structures such that with the aft shelf in the horizontal retention location and the forward shelf in the first retention location, an upper surface of the forward shelf and an upper surface of the aft shelf are co-planar, the aft shelf and the forward shelf being separate and movable independent of one another, and with the seatback in the upright orientation, the aft shelf in the vertical retention location and the forward shelf in the second retention location, the back surface of the seatback, the forward shelf and the aft shelf define a completely enclosed storage space between the first and second side surface structures.

2. The vehicle body structure according to claim 1, wherein the forward shelf is movable to a third retention location between the first and second side wall structures, the third retention location being located below the first retention location.

3. The vehicle body structure according to claim 2, wherein the aft shelf is movable to a lower horizontal retention location below the horizontal retention location such that with the forward shelf in the third retention location and the aft shelf in the second horizontal retention location, the upper surface of the forward shelf and the upper surface of the aft shelf are co-planar.

4. The vehicle body structure according to claim 1, wherein the aft shelf is movable to a lower horizontal retention location below the horizontal retention location.

5. The vehicle body structure according to claim 1, wherein with the seatback in the folded orientation, the forward shelf in the first retention location and the aft shelf in the horizontal retention location, the forward shelf, the aft shelf and a back surface of the seatback define an approximately planar cargo receiving surface.

6. The vehicle body structure according to claim 1, wherein a rear end of the vehicle floor and respective rear edges of the first and second side wall structures define a rear hatch opening and with the aft shelf in the horizontal retention location the upper surface of the aft shelf is co-planar with a lowermost portion of the rear hatch opening.

7. The vehicle body structure according to claim 1, further comprising
a first tether having a first end attached the vehicle floor and a second end attached to the forward shelf, and
a second tether having a first end attached the vehicle floor and a second end attached to the aft shelf.

8. The vehicle body structure according to claim 7, wherein
the first tether is removably attached to the forward shelf such that with the first tether detached from the forward shelf the forward shelf is removable from the vehicle cargo area, and
the second tether is removably attached to the aft shelf such that with the second tether detached from the aft shelf the aft shelf is removable from the vehicle cargo area.

9. The vehicle body structure according to claim 1, wherein
the aft shelf is dimensioned such that with the aft shelf in the vertical retention location and the forward shelf in the second retention location, an uppermost portion of the aft shelf extends above the upper surface of the forward shelf.

10. The vehicle body structure according to claim 1, wherein
the vehicle floor defines a concealed storage space with a covering panel overlaying the concealed storage space, an upper surface of the covering panel being located below the first retention location of the forward shelf.

11. The vehicle body structure according to claim 10, wherein
with the forward shelf in either one of the first retention location and the second retention location the aft shelf is movable to a storage location located below the forward shelf such that the aft shelf overlays a portion of the covering panel.

12. The vehicle body structure according to claim 1, wherein
the forward shelf includes an aperture adjacent to a rearward edge thereof defining a handle portion.

13. The vehicle body structure according to claim 1, wherein
the aft shelf includes an aperture adjacent to a rearward edge thereof defining a handle portion.

14. A vehicle body structure, comprising:
a vehicle floor;
a first side wall structure extending upward from a first side of the vehicle floor;
a second side wall structure extending upward from a second side of the vehicle floor opposite the first side wall structure, the vehicle floor, the first side wall structure and the second side wall structure at least partially defining a vehicle cargo area, the first side wall structure and the second side wall structure each having a plurality of protrusions, the plurality of protrusions being non-movable;
a forward shelf extending from the first side wall structure to the second side wall structure within the vehicle cargo area, the forward shelf being movable between a first retention location, a second retention location and a third retention location, the first retention location being defined by a first horizontal surface of a first one of the plurality of protrusions and a second horizontal surface on a second one of the plurality of protrusions, the first retention location being further defined between a first upright surface on the first one of the plurality of protrusions and a second upright surface on the second one of the plurality of protrusions, the second retention location being defined by a third horizontal surface on a third one of the plurality of protrusions and a fourth horizontal surface on a fourth one of the plurality of protrusions, the second retention location further being defined between a third upright surface on the first one of the plurality of protrusions and a fourth upright surface on the fourth one of the plurality of protrusions, the third retention location being defined between upright surfaces on the first one of the plurality of protrusions and the second one of the plurality of protrusions, the first retention location being defined a first distance above the vehicle floor, the second retention location being defined at a second distance above the vehicle floor, and the third retention location being defined at a third distance above the vehicle floor, the second distance being greater than the first distance and the third distance, and the first distance being greater than the third distance; and an aft shelf separate from the forward shelf and independently movable relative to the forward shelf, the aft shelf extending from the first side wall structure to the second side wall structure within the vehicle cargo area adjacent to the forward shelf, the aft shelf being movable between a first horizontal retention location, a second horizontal retention location and a vertical retention location, the second horizontal retention location being defined by a horizontal surface on a fifth one of the plurality of protrusions and a horizontal surface on a sixth one of the plurality of protrusions, the second horizontal retention location being further defined between an upright surface of the second one of the plurality of protrusions and an upright surface on the sixth one of the plurality of protrusions, the first horizontal retention location being defined between another upright surface of the second one of the plurality of protrusions and a further upright surface on the sixth one of the plurality of protrusions, such that with the aft shelf in the first horizontal retention location and the forward shelf in the third retention location, an upper surface of the forward shelf and an upper surface of the aft shelf are co-planar, and with the aft shelf in the second horizontal retention location and the forward shelf in the first retention location, an upper surface of the forward shelf and an upper surface of the aft shelf are co-planar, and with the aft shelf in the vertical retention location and the forward shelf in the second retention location, the forward shelf and the aft shelf at least partially define an enclosed storage space within the vehicle cargo area.

15. The vehicle body structure according to claim 14, further comprising
a first tether having a first end attached the vehicle floor and a second end attached to the forward shelf, the first tether limiting movement of the forward shelf to movement between the first, second and third retention locations, and
a second tether having a first end attached the vehicle floor and a second end attached to the aft shelf, the second tether limiting movement of the aft shelf to movement between the first horizontal retention location, the second horizontal retention location and the vertical retention location.

16. The vehicle body structure according to claim 15, wherein
the first tether is removably attached to the forward shelf such that with the first tether detached from the forward shelf the forward shelf is removable from the vehicle cargo area, and
the second tether is removably attached to the aft shelf such that with the second tether detached from the aft shelf the aft shelf is removable from the vehicle cargo area.

17. A vehicle body structure, comprising:
a vehicle floor;
a first side wall structure extending upward from a first side of the vehicle floor;
a second side wall structure extending upward from a second side of the vehicle floor opposite the first side wall structure, the vehicle floor, the first side wall structure and the second side wall structure at least partially defining a vehicle cargo area, the first side wall structure and the second side wall structure each having a plurality of protrusions, the plurality of protrusions being non-movable;

a forward shelf extending from the first side wall structure to the second side wall structure within the vehicle cargo area, the forward shelf being movable between a first retention location and a second retention location, the first retention location being defined by a first horizontal and a first upright surface of a first one of the plurality of protrusions and a second horizontal surface and a second upright surface of a second one of the plurality of protrusions, the second retention location being defined by a third horizontal and a third upright surface of a third one of the plurality of protrusions and a fourth horizontal surface and a fourth upright surface of a fourth one of the plurality of protrusions, the first retention location being defined a first distance above the vehicle floor, the second retention location being defined at a second distance above the vehicle floor, the second distance being greater than the first distance; and an aft shelf extending from the first side wall structure to the second side wall structure within the vehicle cargo area adjacent to the forward shelf, the aft shelf being movable between a horizontal retention location and a vertical retention location, the horizontal retention location being defined by a fifth horizontal surface of a fifth one of the plurality of protrusions, the vertical retention location being defined by a fifth upright surface of the fifth one of the plurality of protrusions and a sixth upright surface of the second one of the plurality of protrusions, such that with the aft shelf in the horizontal retention location and the forward shelf in the first retention location, an upper surface of the forward shelf and an upper surface of the aft shelf are co-planar, and with the aft shelf in the vertical retention location and the forward shelf in the second retention location the forward shelf and the aft shelf at least partially define an enclosure within the vehicle cargo area with an uppermost portion of the aft shelf extending above the upper surface of the forward shelf.

18. The vehicle body structure according to claim 17, wherein
the forward shelf is movable to a third retention location between the first and second side wall structures, the third retention location being located below the first retention location.

19. The vehicle body structure according to claim 18, wherein
the aft shelf is movable to a lower horizontal retention location below the horizontal retention location such that with the forward shelf in the third retention location and the aft shelf in the second horizontal retention location, the upper surface of the forward shelf and the upper surface of the aft shelf are co-planar.

20. The vehicle body structure according to claim 17, further comprising
a rear seat fixedly attached to the vehicle floor and having a seatback in an upright orientation, a back surface of the seatback at least partially defining the vehicle cargo area,
wherein with the aft shelf in the vertical retention location and the forward shelf in the second retention location, the forward shelf, the uppermost portion of the aft shelf, the seatback, and portions of the first and second side wall structures define a storage space within the vehicle cargo area that restricts horizontal movement of cargo placed on the forward shelf.

* * * * *